Aug. 16, 1960  F. PULSIFER  2,948,906
MACHINES FOR TRIMMING SHOE-ATTACHED HEELS
Filed July 2, 1958  14 Sheets-Sheet 1

*Inventor*
Frank Pulsifer
By his Attorney
Carl E. Johnson

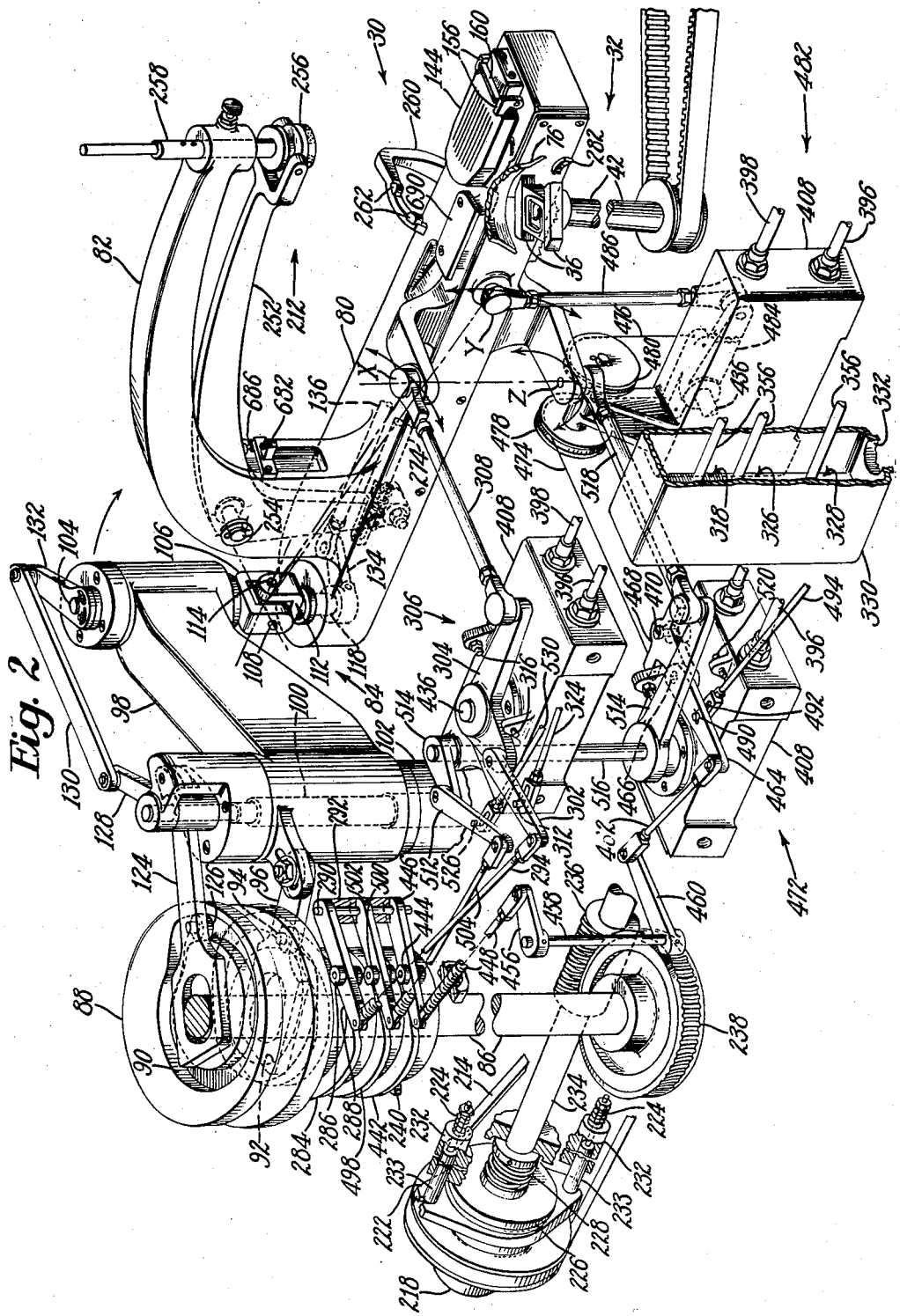

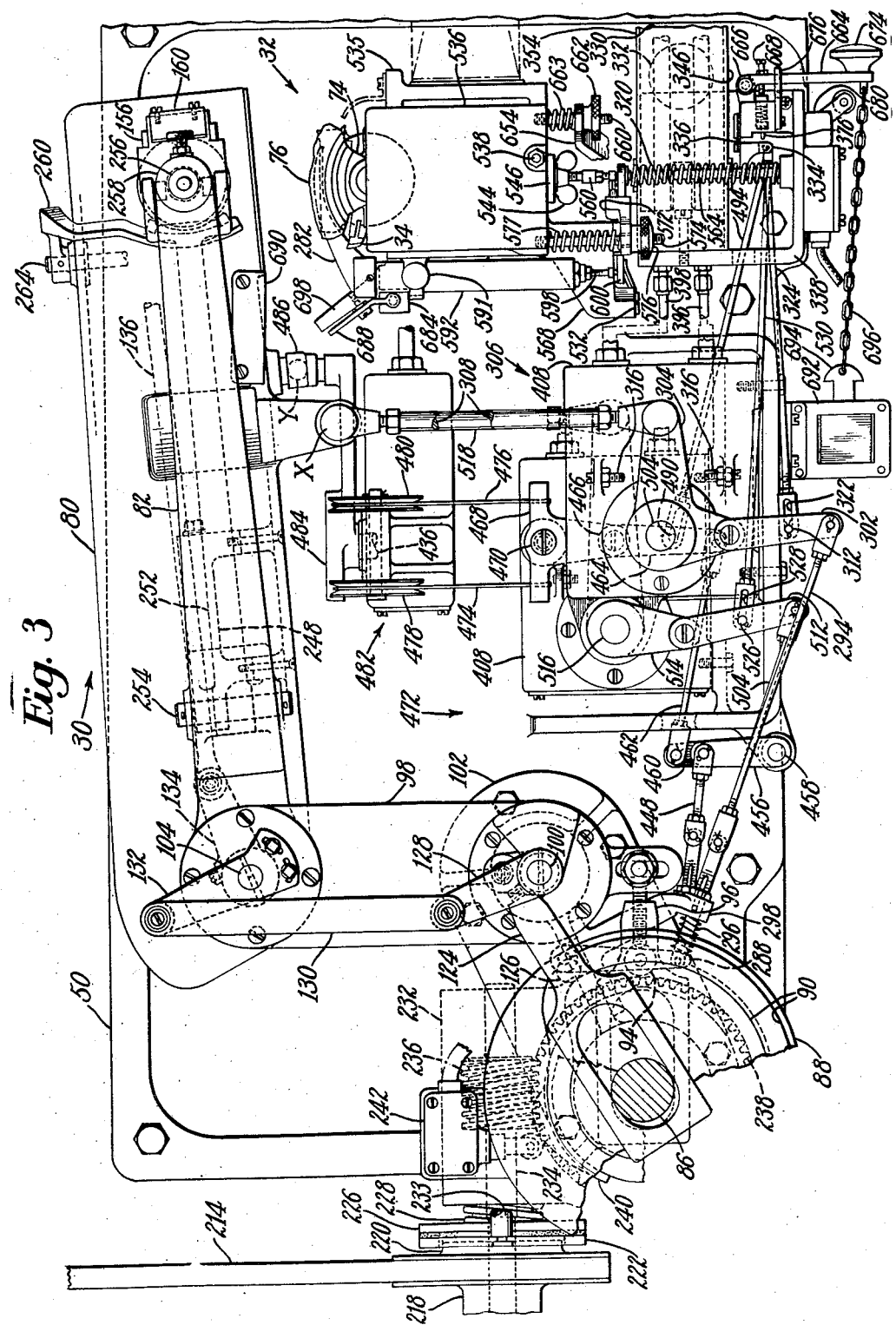

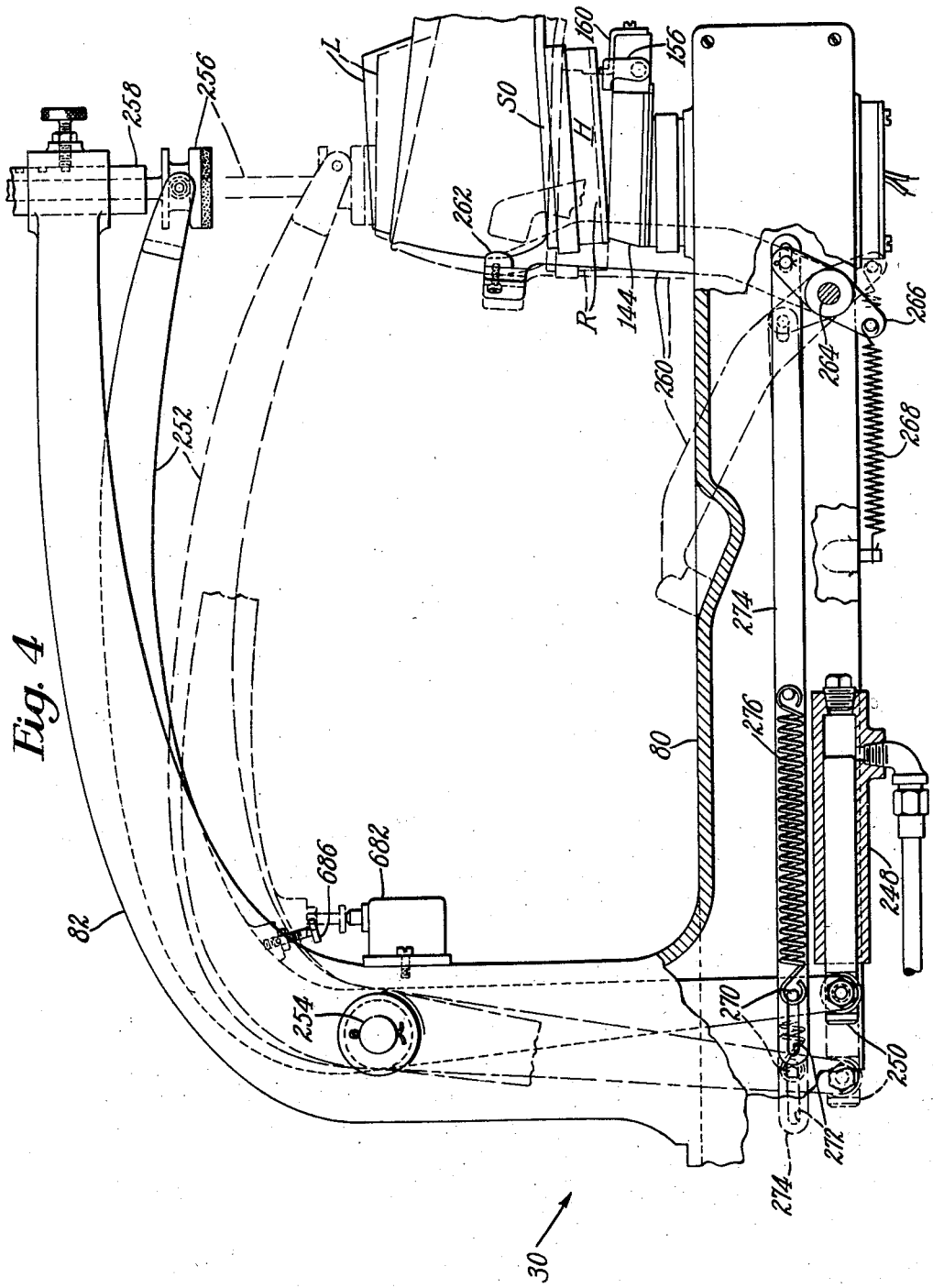

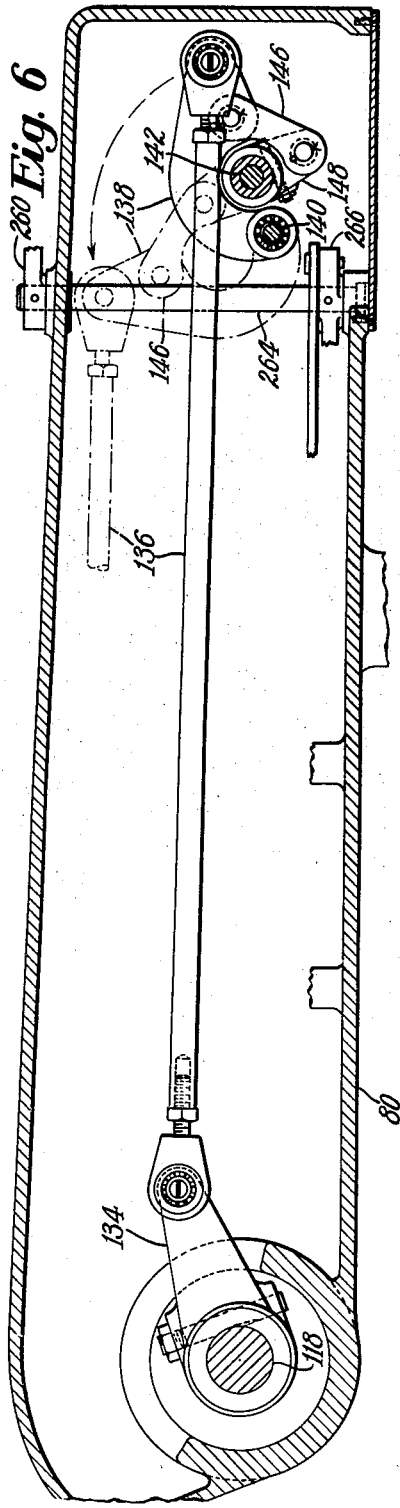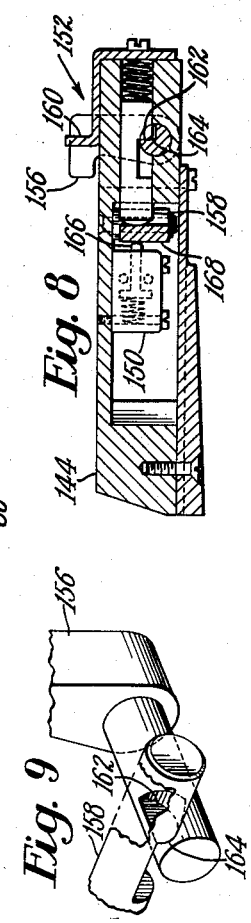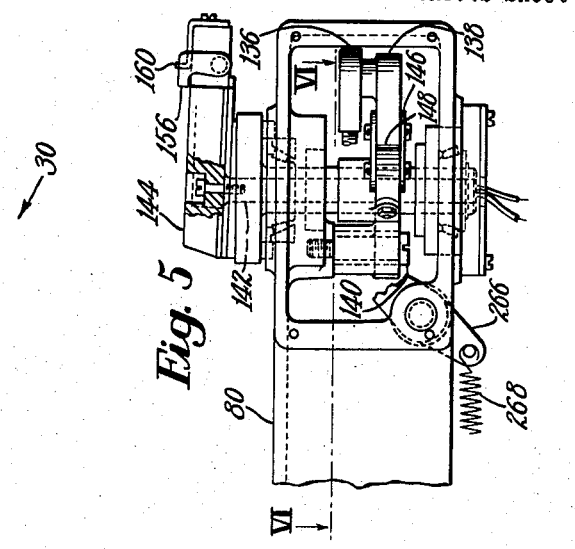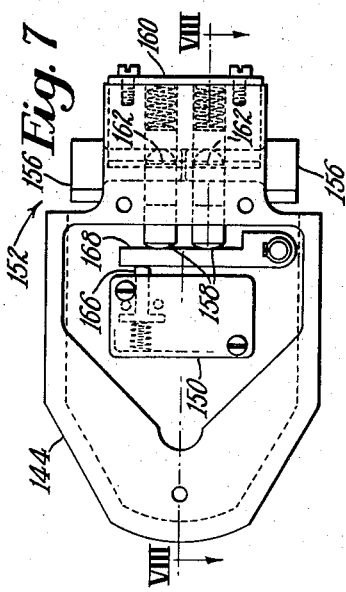

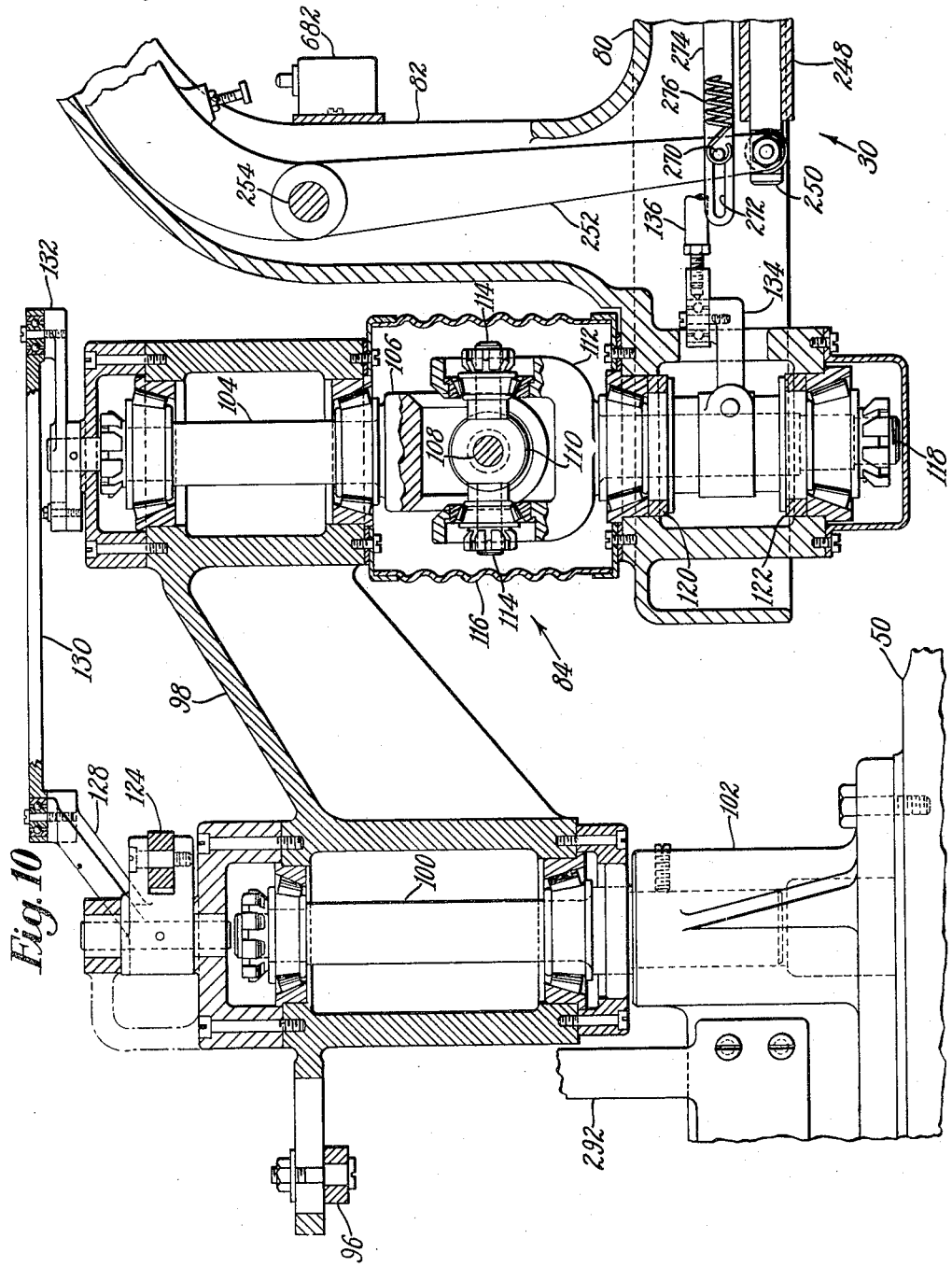

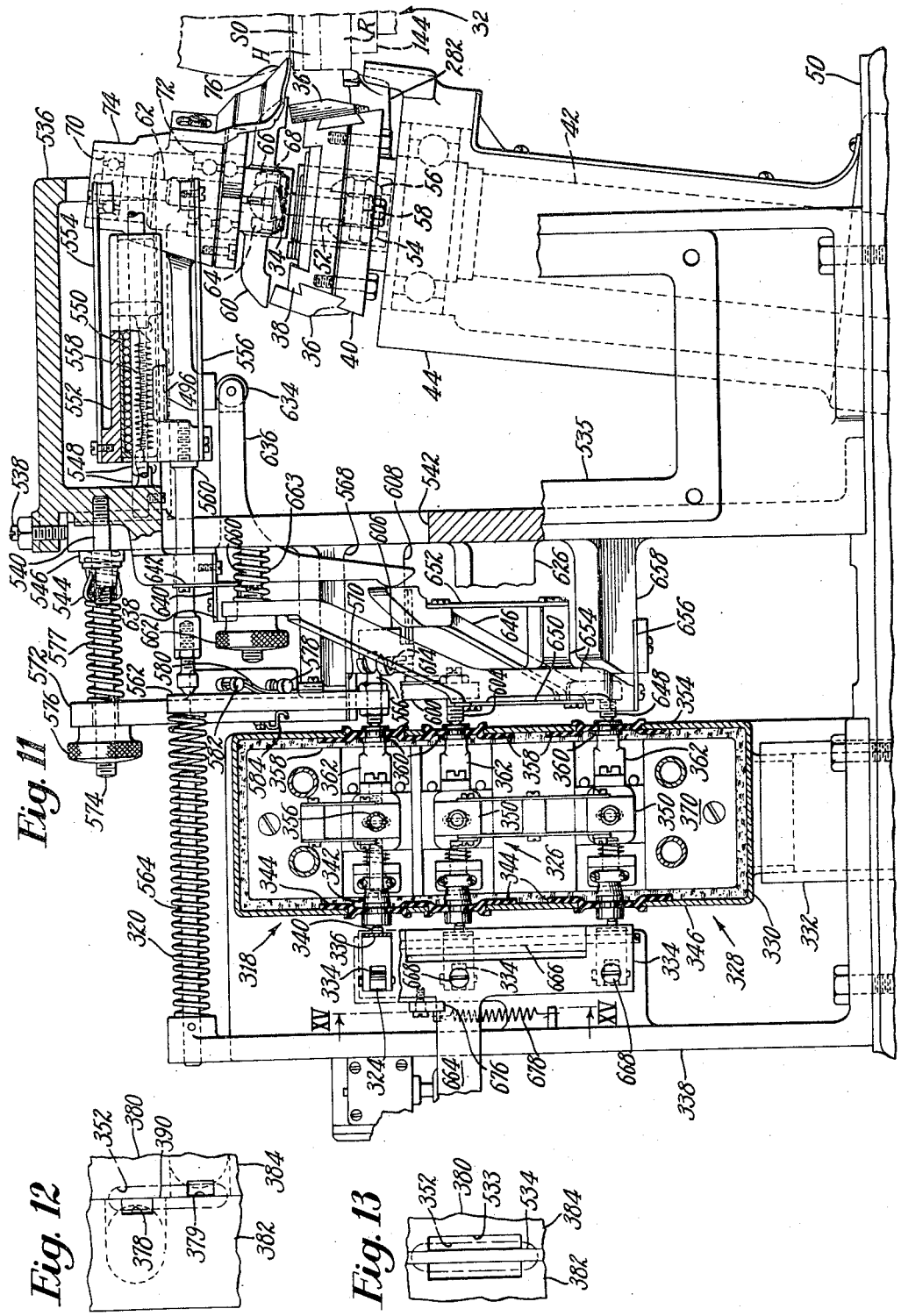

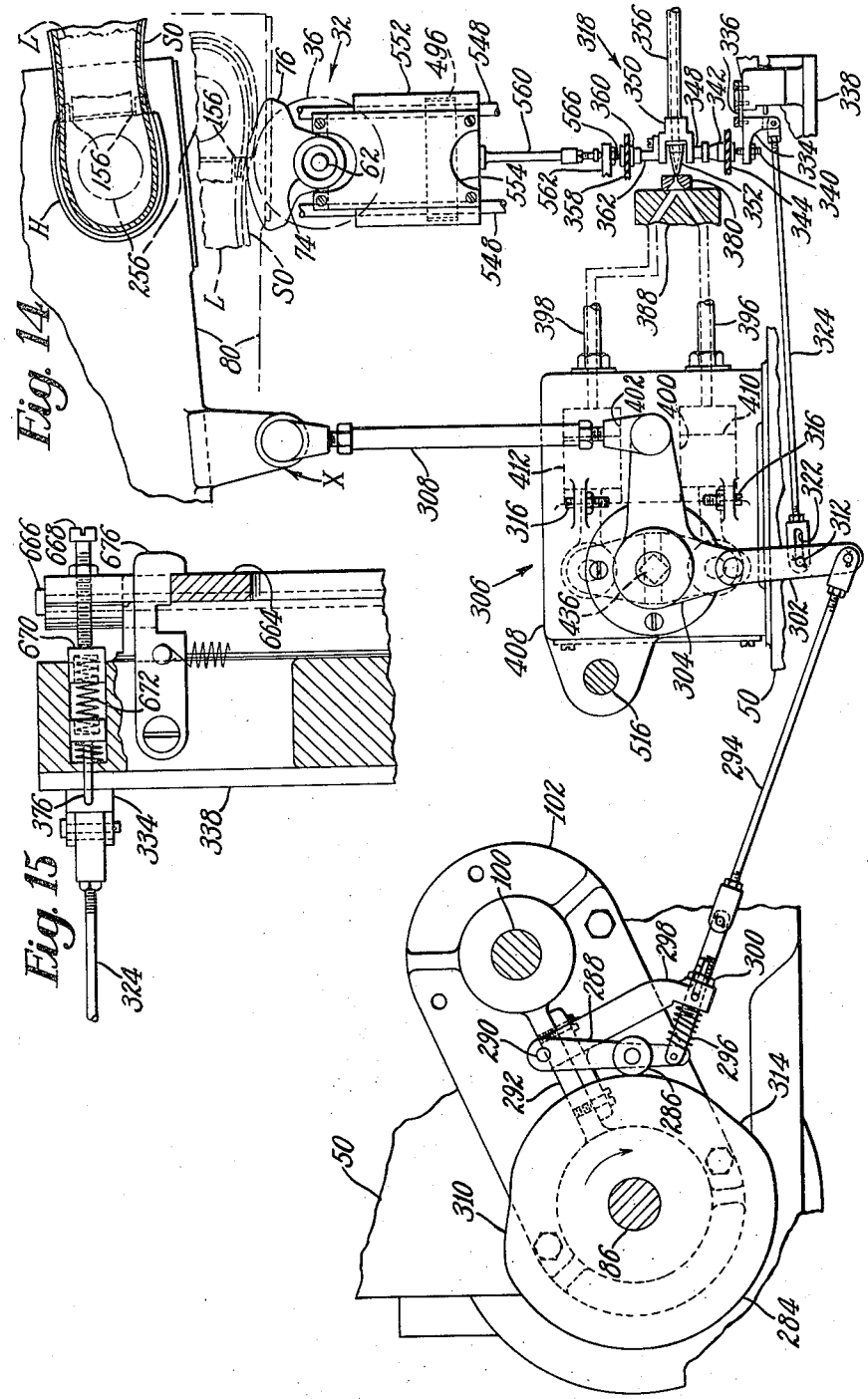

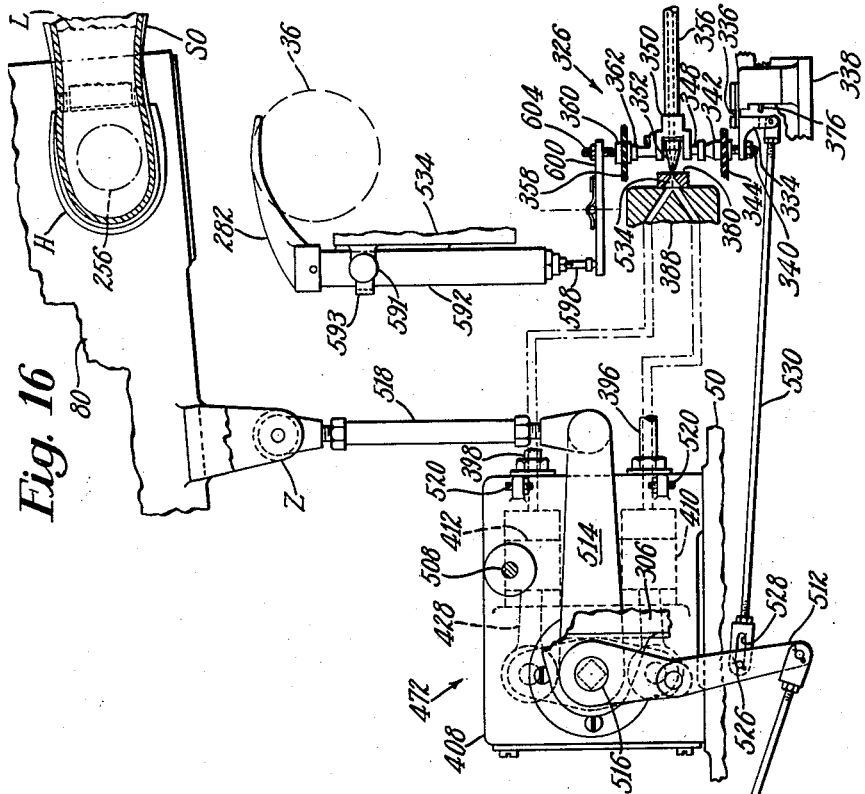
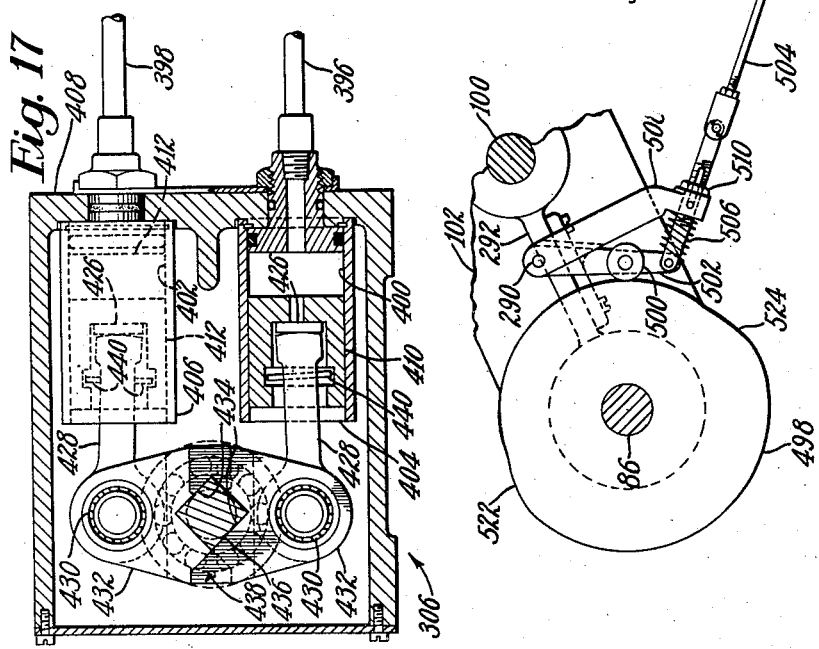

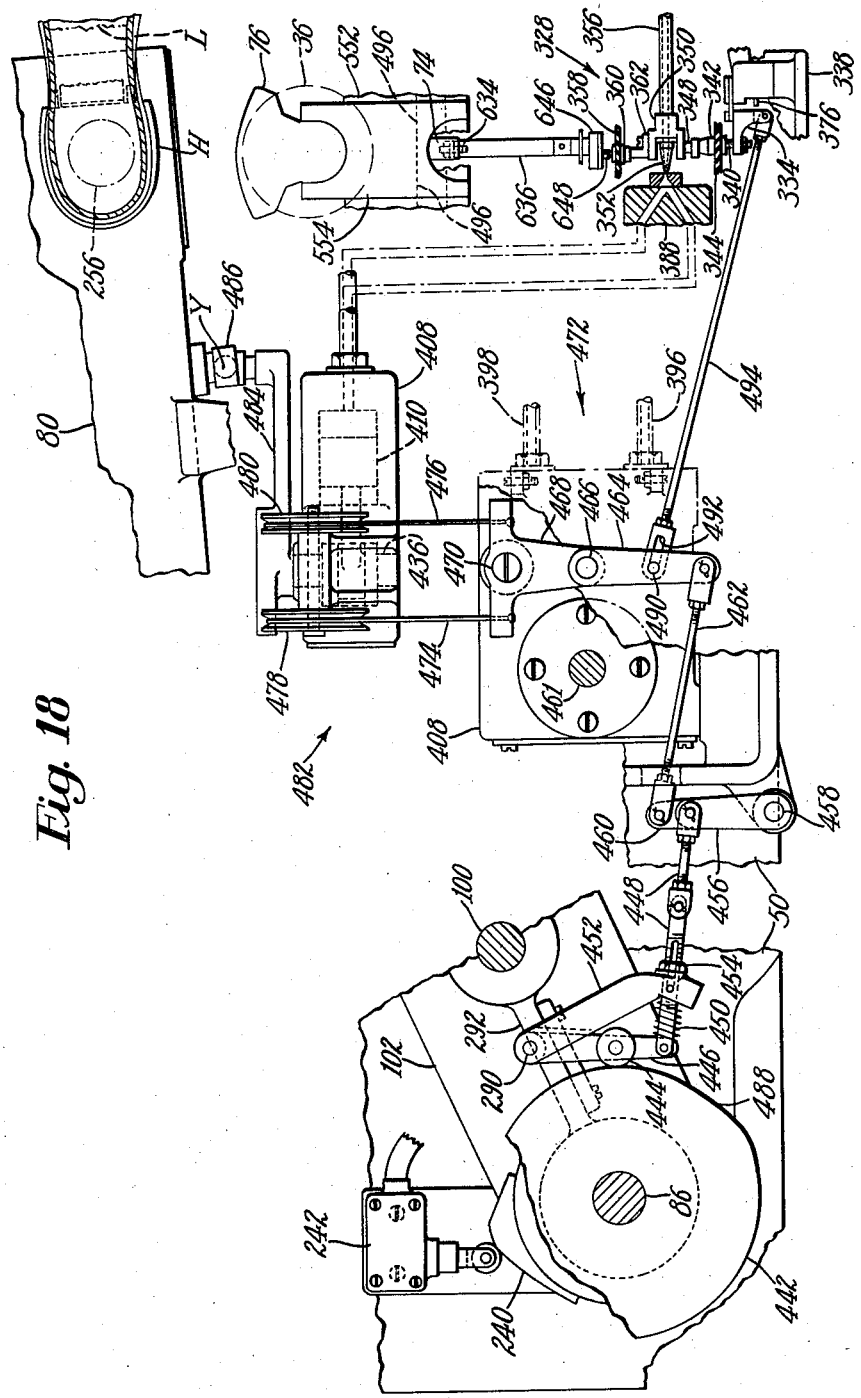

Aug. 16, 1960     F. PULSIFER     2,948,906
MACHINES FOR TRIMMING SHOE-ATTACHED HEELS
Filed July 2, 1958     14 Sheets-Sheet 11
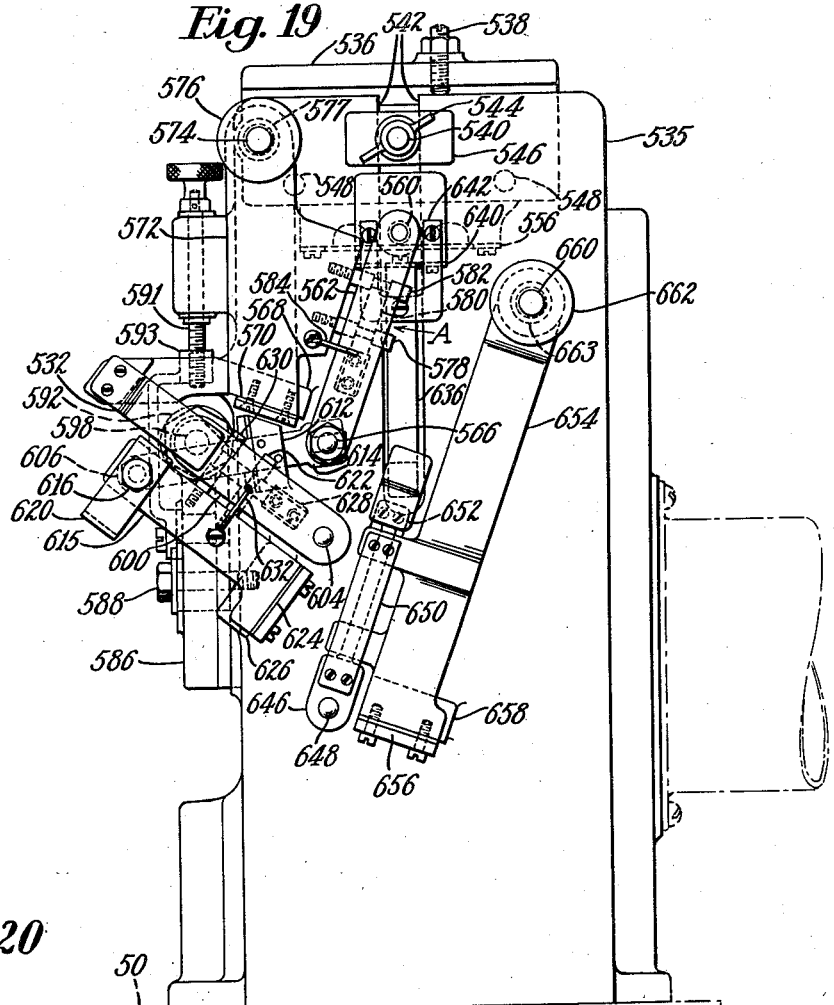
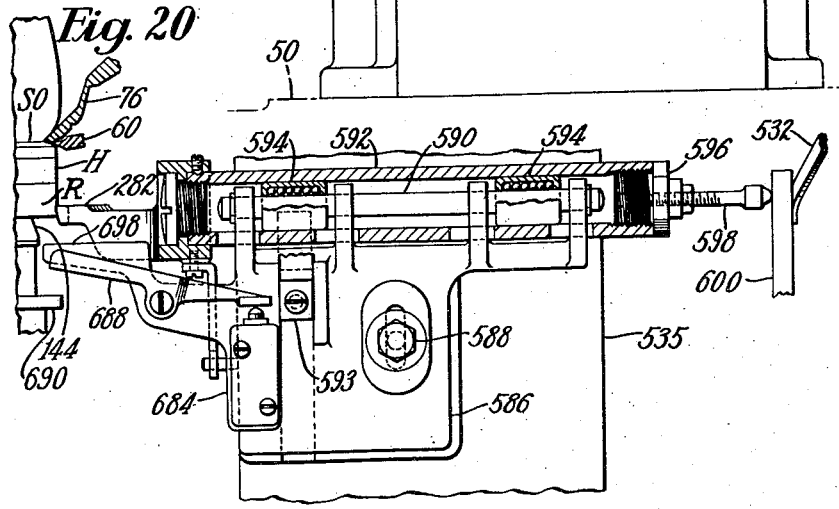

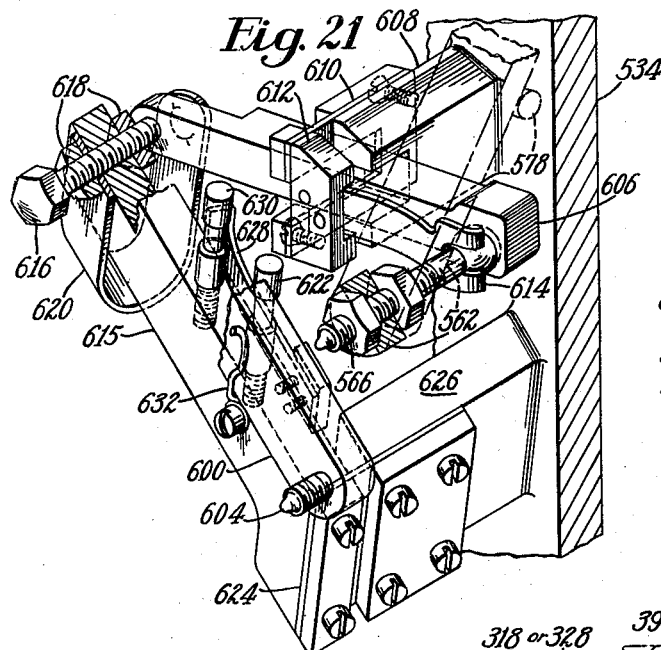
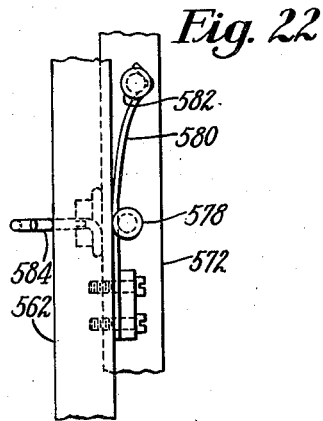
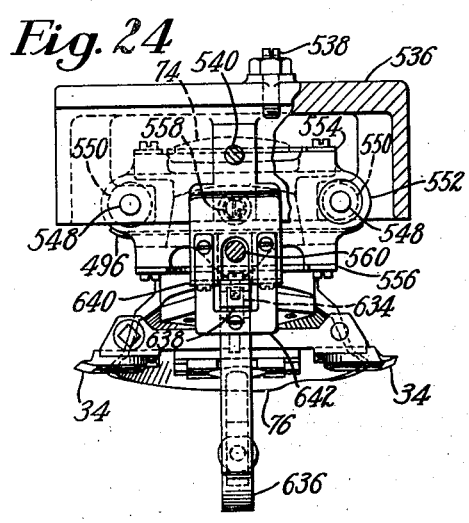
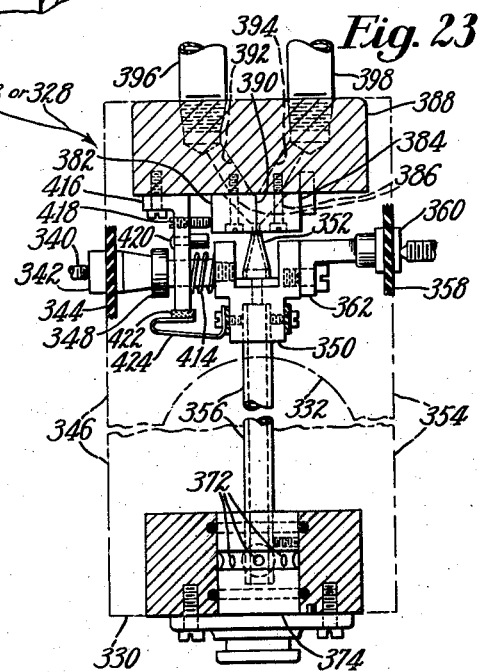
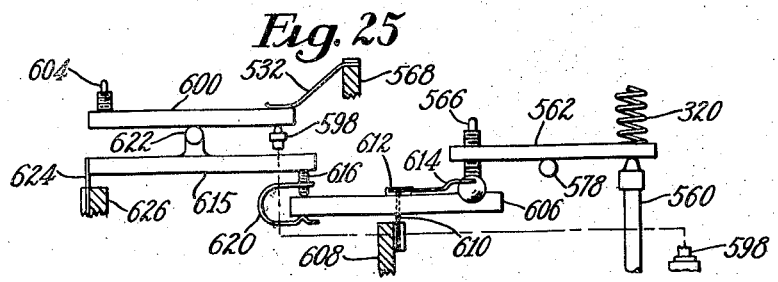

Aug. 16, 1960   F. PULSIFER   2,948,906
MACHINES FOR TRIMMING SHOE-ATTACHED HEELS
Filed July 2, 1958   14 Sheets-Sheet 13

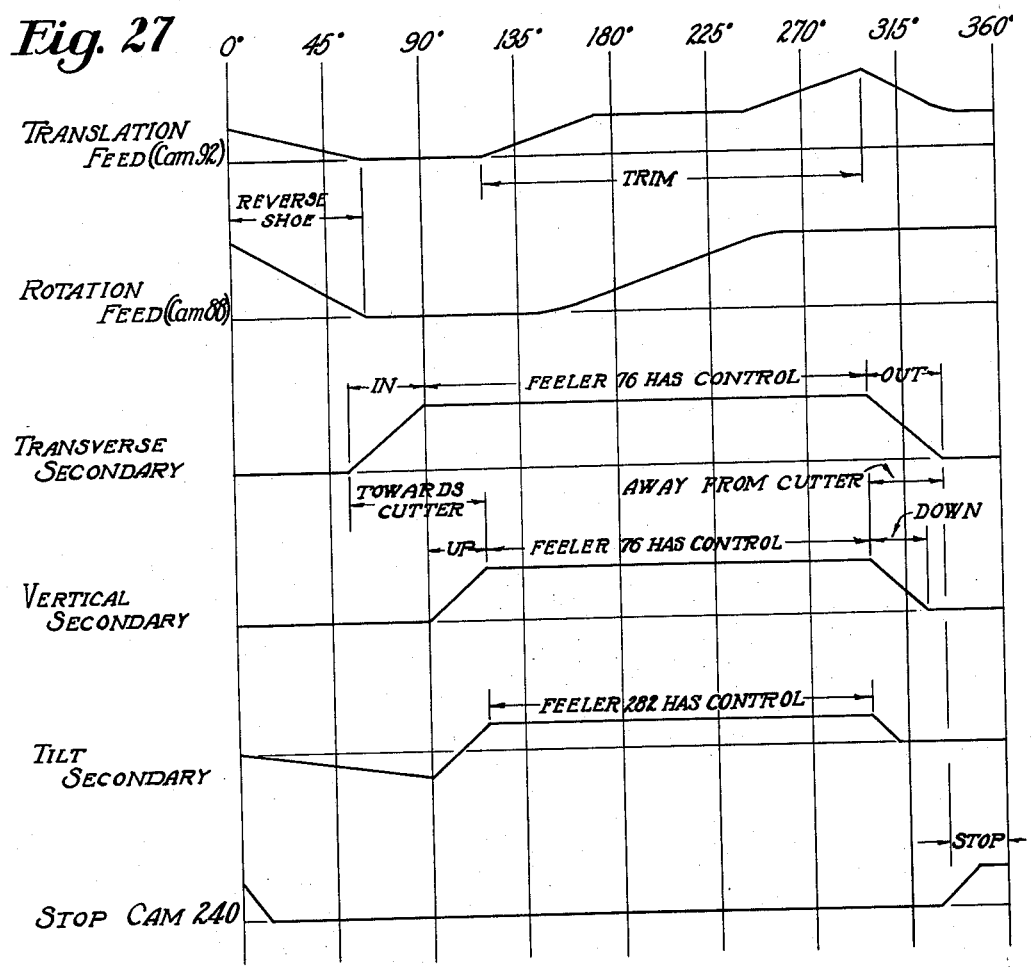
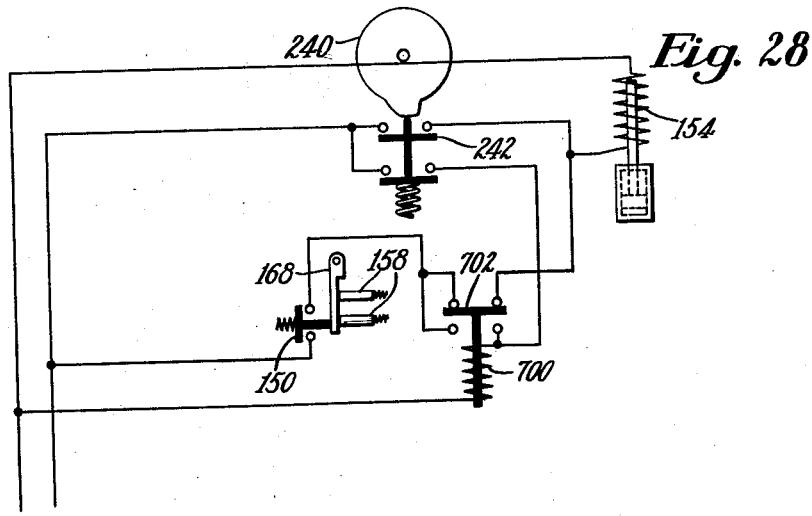

_2,948,906_

MACHINES FOR TRIMMING SHOE-ATTACHED HEELS

Frank Pulsifer, Hamilton, Mass., assignor to United Shoe Machinery Corporation, Boston, Mass., a corporation of New Jersey Filed July 2, 1958, Ser. No. 746,252

14 Claims. (Cl. 12—87)

This invention relates to the provision of improved means for operating on the heel ends of shoes, and more especially to a novel and automatic machine for trimming shoe-attached heels to conform to the shapes of heel ends of the shoes. Although the invention is illustrated herein as being embodied in an automatic heel trimming machine of the general type disclosed in United States Letters Patent No. 2,644,968, granted July 14, 1953 upon an application of Walter L. Benedict, Harry D. Goodnow and Frank Pulsifer, it is to be noted that in its various novel aspects the present invention is not necessarily thus limited.

In the machine described in the patent referred to above, the shoe to be trimmed is carried on a revolved and rotated support which is moved to position the heel periphery relatively to a heel shaping tool by power-operated means which are under the control of shoe-engaging feelers. This is to say that the support provides an average path through which the shoe is moved, and a secondary control system comprising servo mechanism responsive to heel end contour continuously "corrects," or allows for, any deviations from the average path due to particular size, positioning or other variable. Movements of the shoe support laterally toward and away from the tool, in a direction heightwise of the shoe, and to tilt the shoe are effected, respectively, by three fluid-pressure-operated motors each controlled by a jet relay (preferably of the type fully disclosed in United States Letters Patent No. 2,672,150, issued March 16, 1954 on an application filed in the names of Walter L. Benedict and Sidney J. Finn) and the relays are primarily operated by a pair of feelers. As shown in the Patent No. 2,644,968 the feeler which determines the lateral and heightwise positions of the heel end of the shoe rides in its rand crease, and the feeler effective to tilt the shoe is arranged to engage the attached heel adjacent to its tread surface. The means provided in the machine of the last mentioned patent for successively revolving and rotating the shoe support include relatively unwieldly slide-carriages, and a pair of fluid-pressure-rotated cams together with associated gearing necessarily entailing objectionable backlash.

While fundamental shoemaking and machine design principles as just briefly described and more fully related in Patent No. 2,644,968 have been shown by actual shoemaking usage to be sound and can produce fairly satisfactory results, it is a primary object of the present invention to provide an improved machine of this same general type which is capable of higher production speeds and of superior shoe positioning accuracy in operation, the improved machine to afford a more economical and somewhat simplified construction more easily operated by relatively unskilled workers.

In harmony with the object just stated, and in accordance with a feature of the present invention, there is provided in a machine of the type under consideration novel shoe supporting means partly suspended at a point remote from a shoe thereon for responsively and dependably holding the shoe to be shaped by the tool, and mechanism for laterally moving the shoe supporting means toward and away from the tool, and in a direction heightwise of the supported shoe by swinging motion about the point of suspension, and the shoe-holding means being mounted for tilting movement about an axis passing substantially through said point and the point of engagement of a feeler with the shoe, said mechanism being so connected to the shoe-supporting means as to have substantially no coupling moment about said axis. Preferably, and as herein shown, the shoe is thus supported for rolling movement about an axis having the least unbalanced mass possible, the axis extending through the point of support (which is preferably a universal joint) and the point on the heel periphery engaged by the feeler. Also in keeping with good design practice, the shoe supporting means and other portions of the present automatic heel shaping machine are herein shown as adapted to avoid gearing backlash, and to afford relatively low inertia and high rigidity, features which contribute greatly to enhanced responsiveness, and increased efficiency and effectiveness in the secondary control system.

Auxiliary electrical control devices are disclosed in the heel shaping machine of Patent No. 2,644,968 heretofore referred to whereby, before the shoe support is revolved and rotated to commence a trimming operation, nozzles of the respective jet relays are biased from neutral positions to cause the heel end of the supported shoe to be held in a loading position away from the tool. Then, the devices being deenergized, the respective jet nozzles are released to the influence of springs for moving rather cumbersome slide carriages consisting of heavy table, frame and base castings thus to cause the heel end to be presented to the feelers; thereupon, the nozzles having been returned to their approximately neutral positions by the engagement of the shoe with the feelers, the shoe support is moved by gearing and by the mentioned castings, as actuated by jet relay-controlled fluid pressure motors, to cause the tool to operate along the heel periphery. The arrangement accordingly is a somewhat massive one in which effecting the major movements for presenting and subsequently removing the shoe and its support with respect to the tool, as well as the normal minor or correcting movements during shaping, imposes rather heavy burdens on the jet relay control system. With a view toward simplification and increased productivity as well as advantageously restoring the servo mechanism to its primary refining function and to insure a very minimum of opportunity for lost motion in the organization, the present invention further features the provision of mechanical or cam controlled means for operating at times through jet relay-controlled mechanism to cause the major movements of the shoe and shoe support relatively to the operating tool and a feeler, and the jet relay-controlled mechanism is adapted for independently moving the supported shoe at other times, i.e. during trimming, in minor increments relatively to the tool in accordance with the refined dictates of the feeler while engaged by the shoe. As herein shown a main cam shaft is caused to complete a single revolution to perform an operating cycle of the machine. The shaft carries one pair of cams for predeterminedly moving the shoe support to feed the shoe thereon in translation and rotation relatively to the tool, and a set of three cams for initiating movement of the shoe support to present and later remove the heel end of the shoe thereon with respect to the tool. Each of these three cams is operative through a jet relay and an actuator device controlled thereby to move the shoe support, one effecting major movements toward and away from the tool, another effecting such major movements in a direction heightwise of the shoe, and the third causing major tilting of the shoe support. Each of the three cams is formed to be inoperative, in effect, during a considerable portion of the operating cycle and, as herein illustrated, in such inoperative intervals and while shoe shaping is being effected by the tool, the respective actuator devices are constructed and arranged to be under the sensitive and exclusive domination of the jet relays, respectively, as influenced by a shoe engaging feeler. Advantageously, in each of the actuator devices an operating member which is at times actuated solely by the throw of one of the three cams to develop a differential in jet relay controlled fluid pressure for moving the shoe support to a predetermined position is responsive to approach of the support to said position to develop a feed back effective to nullify said differential. Moreover, as herein shown and described, novel and highly sensitive means are employed during trimming whereby feeler movements are transmitted to derive precisely corresponding displacements of the nozzles of the jet relays and hence of the operating member and the shoe support.

The above and other features of the invention including various novel combinations and arrangements of parts are hereinafter described with greater particularity in connection with an illustrative machine in which they are embodied, and with reference to the accompanying drawings thereof in which Fig. 1 is a perspective view of an exemplary heel shaping machine;

Fig. 2 is a perspective view of the novel shoe support shown in Fig. 1 together with a portion of associated operating mechanism in normal stop position and as seen from a different angle;

Fig. 3 is a plan view of a portion of the machine with certain parts broken away;

Fig. 4 is an enlarged view in elevation and partly in vertical section of a portion of the shoe support, a heel end of a shoe being mounted thereon with the aid of a heel end gage;

Fig. 5 is a view in elevation of a heel tread support and a heel-breast-engaging abutment together with switch mechanism controlled thereby;

Fig. 6 is a horizontal section taken on the plane indicated by the line VI—VI in Fig. 5 and showing parallel linkage for rotating the heel tread support;

Fig. 7 is a bottom view of the switch mechanism shown in Fig. 5;

Fig. 8 is a section taken on the line VIII—VIII of Fig. 7;

Fig. 9 is a perspective view of certain cooperating parts shown in Figs. 7 and 8;

Fig. 10 is a view in side elevation and largely in vertical section showing the mounting of the work support and some of the primary means for moving it in translation and rotation;

Fig. 11 is a view in front elevation of a portion of the machine shown in Fig. 1 and including a trimming tool and feelers, with certain parts broken away and others, including a housing for three jet relay controls, shown in vertical section;

Fig. 12 is a schematic view of the nozzle and spaced receiver block openings in either of the jet relays for controlling transverse and vertical movements of the shoe support;

Fig. 13 is a view similar to Fig. 12 but relating to the jet relay controlling tilting movement of the shoe support;

Fig. 14 is a somewhat schematic plan view similar to Fig. 3 with certain parts omitted and showing an actuator device for moving a supported heel end laterally toward and away from the tool, and indicating an operating member of the actuator device in a closed loop, jet relay controlled servo arrangement;

Fig. 15 is a section taken on the line XV—XV of Fig. 11 and showing details of a manual safety switch for stopping the tool and removing the shoe therefrom;

Fig. 16 is a view corresponding to Fig. 14 but relating to the actuator device and cam and feeler control means for tilting a supported heel end relatively to the tool;

Fig. 17 is a sectional view common to any one of the three actuator devices and indicating the means for applying jet relay controlled fluid pressure on a shoe support operating member;

Fig. 18 is a view corresponding to Figs. 14 and 16 but relating to the actuator device and control means for moving a supported heel end heightwise;

Fig. 19 is a view in left-hand elevation of a tool housing shown in Fig. 3 and illustrating operating connections between the shoe engaging feelers and jet relays;

Fig. 20 is a view in rear elevation and partly in vertical section of the feelers and associated mechanism;

Fig. 21 is an angular view of parts shown in Figs. 19 and 20;

Fig. 22 is a detail view taken in the direction of the arrow A in Fig. 19;

Fig. 23 is a plan view and largely in section of one of the jet relay controls;

Fig. 24 is a view of the rand cutter head shown in Fig. 11 and looking from left to right therein;

Fig. 25 is a schematic plan view of servo linkage partly shown in Figs. 19 and 21 for eliminating a heel tilting signal when both feelers are displaced same amount and same direction;

Fig. 27 is a timing chart showing the mechanical or cam controlled movements of the shoe support and indicating the intervals in which feeler control is imposed; and Fig. 28 is an electrical diagram of operating control of the machine.

Figure 1:
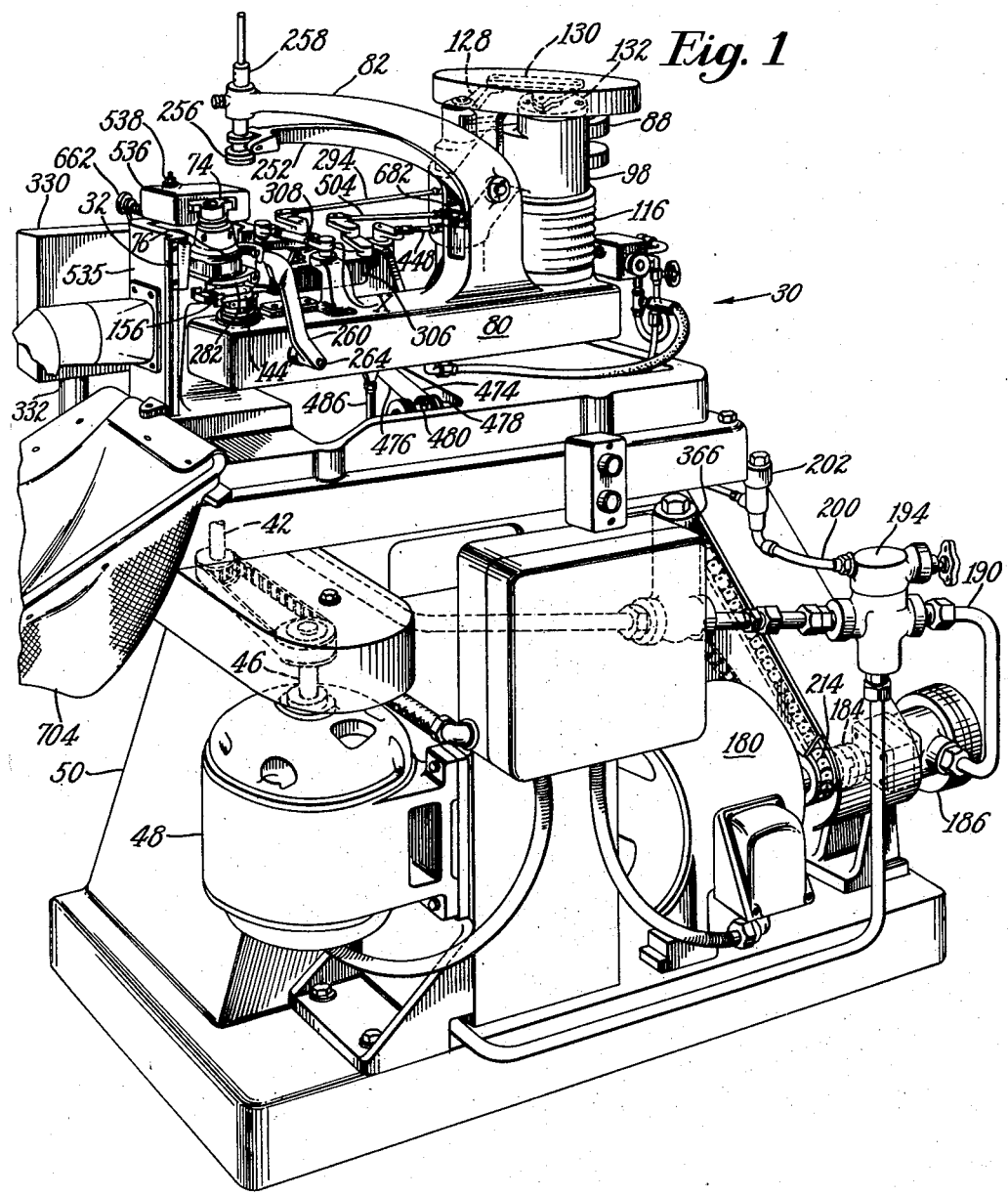

The illustrative machine will be described with reference to trimming a heel H and perhaps including a top lift R attached to an outsole SO of a shoe (Fig. 4) mounted on a last L. The machine itself comprises a shoe support generally designated 30 (Figs. 1, 2 and 3) for holding and moving the shoe to be trimmed with respect to a shaping tool indicated generally by the reference character 32 (Figs. 1, 2, 3 and 11). In shaping the heel end of the shoe, as in the machine disclosed in United States Letters Patent No. 2,644,968 referred to, once the shoe is loaded in the support 30 the shoe is positioned relatively to the tool 32 by means of lateral, heightwise and tilting movements imparted to the shoe support. Although the mechanisms for originating and imparting such movements are of improved design as will be hereinafter described, the sequence of movement remains basically unchanged in that the shoe is moved in translation and rotation from a loading position (Fig. 4) to a location in which the tool engages the heel end periphery adjacent to the corner of the heel breast on one side of the heel and is then translated and rotated, successively, to cause the tool to operate along the entire periphery of the heel end to the corner of its heel breast at the opposite side, the shoe then being removed from the tool and returned to its loading position.

As shown in Figs. 11 and 24 the tool 32 comprises a pair of randing cutters 34 and a pair of trimming cutters 36. The latter are clamped to blocks 38, 40 (Fig. 11) which are connected to the upper end of a drive shaft 42 (Figs. 1, 2 and 11) extending upwardly at a fixed angle and having bearings in a cutter frame 44. For operating the shaft 42 its lower end is provided with a pulley and belt connection to a vertical drive shaft 46 of an electric motor 48 (Fig. 1) mounted on a main frame 50. The motor is continuously operated in the normal use of the machine. The randing cutters 34 are clamped to the upper ball end of a relatively short shaft 52 (Fig. 11) having a universal connection at its lower end with the drive shaft 42. For this purpose the upper end of the drive shaft is formed with an axial bore for receiving the shaft 52 and is provided with oppositely spaced keyways for respectively receiving arcuate keys 54, 56. These keys and the lower end of the shaft 52 are bored to receive a bearing or coupling pin 58, and accordingly the arrangement is such that the randing and trimming cutters are rotated at the same speed and the axis of the randing cutters may be offset from that of the cutters 36. For protecting the trimming cutters 36 from harmful engagement from above a two-armed guard 60 (Fig. 11) is provided having an upwardly extending stem 62, and has an axially bored hub for universally receiving the ball end of the shaft 52. Keyways oppositely disposed in the bored hub guard 60 are fitted respectively with arcuate keys 64, 66 which, together with the ball end of the shaft 52, are coaxially bored for receiving a coupling pin 68. The stem 62 is thus rotatable in bearings 70, 72 within a floating carrier 74 (Figs. 1, 3, 11, 14 and 24) adjustably supporting a rand-crease-engaging feeler 76. It is this feeler which, as will later be explained, is effective through connections subsequently to be described to impart lateral and heightwise movements to the shoe support 30 according to the heel end contour engaged.

The shoe support 30 is in the general form of a hollow C-clamp having a base portion 80 (Figs. 3, 4, 6 and 10) which extends horizontally rearward beyond an upright and overhanging arm portion 82. By means now to be explained the support 30 is suspended at a single point at its rear end from a universal joint 84 (Figs. 2 and 10) and is controlled by primary mechanism acting through the joint for imparting translation and rotation to a shoe held by the support. A vertical main cam shaft 86 (Figs. 2, 3, 14, 16, and 18) having fixed bearings in the main frame 50 carries a rotational feed cam 88 formed with a closed track 90 (Figs. 2 and 3), and a circular plate having a closed translational feed cam 92. The latter is engaged by a follower roll 94 mounted on an arm 96 one end of which is formed with a slot for receiving the shaft 86 and the other end of which is adjustably and pivotally connected to an end of a lever 98 (Figs. 2, 3 and 10) fulcrumed on a vertical stud 100 that is fixedly supported in a bearing block 102 (Fig. 10) secured on the frame 50. The other end of the lever 98 supports, for rotation about a vertical axis and in alined thrust bearings, an upper stem 104 of the universal joint 84. A clevis 106 (Figs. 2 and 10) integral with the stem 104 carries a pin 108 mounting a ball 110 of the joint in conventional manner, and a clevis 112 provides alined bearings for carrying coaxial trunnion pins 114, 114 journaled in the ball 110. A fabric hood 116 serves to exclude dust and extraneous matter from the joint 84. A depending stem 118 of the clevis 112 is thus supported for rotation about a vertical axis extending through the universal joint 84 and for swivel movement about other axes extending through this joint. The stem 118 is journaled in thrust bearings 120, 122 (Fig. 10) in the rear end of the base portion 80.

For rotating the shoe to be trimmed in the course of a cycle of the machine, an arm 124 (Figs. 2, 3 and 10) carries a roll 126 lying in the closed track 90. One end of the arm 124 is slotted to receive the shaft 86, and the other end has a pivotal connection with one arm of a bell crank lever 128 pivoted on the stud 100. The other arm of the lever 128, in a parallel linkage arrangement, is connected by a link 130 to a crank arm 132 secured on the upper end of the stem 104. The track 90 thus imparts, through the universal joint 84, rotation to the stem 118 about its longitudinal axis and hence swings an arm 134 (Figs. 3, 6 and 10) clamped thereto. The latter, in a parallel linkage arrangement within the base 80, is connected by a link 136 to one end of a lever 138, the other end of which is pivotally anchored on a stud 140 (Figs. 5 and 6) secured in the base 80. As shown by solid lines in Fig. 6, the axis of a depending stem 142 of a heel tread supporting block 144 (Figs. 1, 2, 4 and 5) mounted in the front end of the base 80 lies initially in alinement with the axes of the stud 140 and of the joint formed by the lever 138 and the link 136. For initially rotating the block 144 and a shoe clamped thereon (by means later explained) counterclockwise 180° as viewed from above (i.e. to shift the shoe from its full-line position to its dash-line position in Fig. 14), a link 146 pivoted at one end to the lever 138 has its other end pivotally connected to an arm 148 clamped on the stem 142.

In manually presenting a shoe to be shaped by the machine an operator will first grasp the toe end of the shoe and place its heel tread on the block 144 as illustrated in Fig. 4. Proper location of the shoe in this manner is automatically effective to initiate a complete cycle of operations of the machine, a switch 150 (Figs. 7, 8 and 28) being disposed to be actuated by a heel breast gage 152 to energize a stop-start solenoid 154 (Figs. 26 and 28) to insure that the breast line of a heel end of a shoe being mounted in the machine is properly positioned with respect to the block 144. The arrangement is such that the switch 150 cannot be closed until both members 156, 156, comprising the gage 152 and coaxially supported in the block 144, are fully actuated, i.e. moved clockwise as viewed in Fig. 8, by engagement therewith of the heel breast. The switch 150 is one of the type normally closed but is adapted to be held open by either of two spring-pressed plungers 158 longitudinally slidable within parallel bores formed in the block 144. The clockwise movement of each member 156 in positioning the heel end against a heel breast stop 160 on the block 144 is effective, through engagement of its radial face 162 (Figs. 1, 7, 8 and 9) with an adjacent recessed face 164 in each plunger 158, to retract the latter and consequently permits a spring-backed trigger 166 of the switch and its actuator 168 pivoted within the block 144 to close the switch for energizing the solenoid 154 associated with the hydraulic system of the machine as will next be explained.

Figure 26:
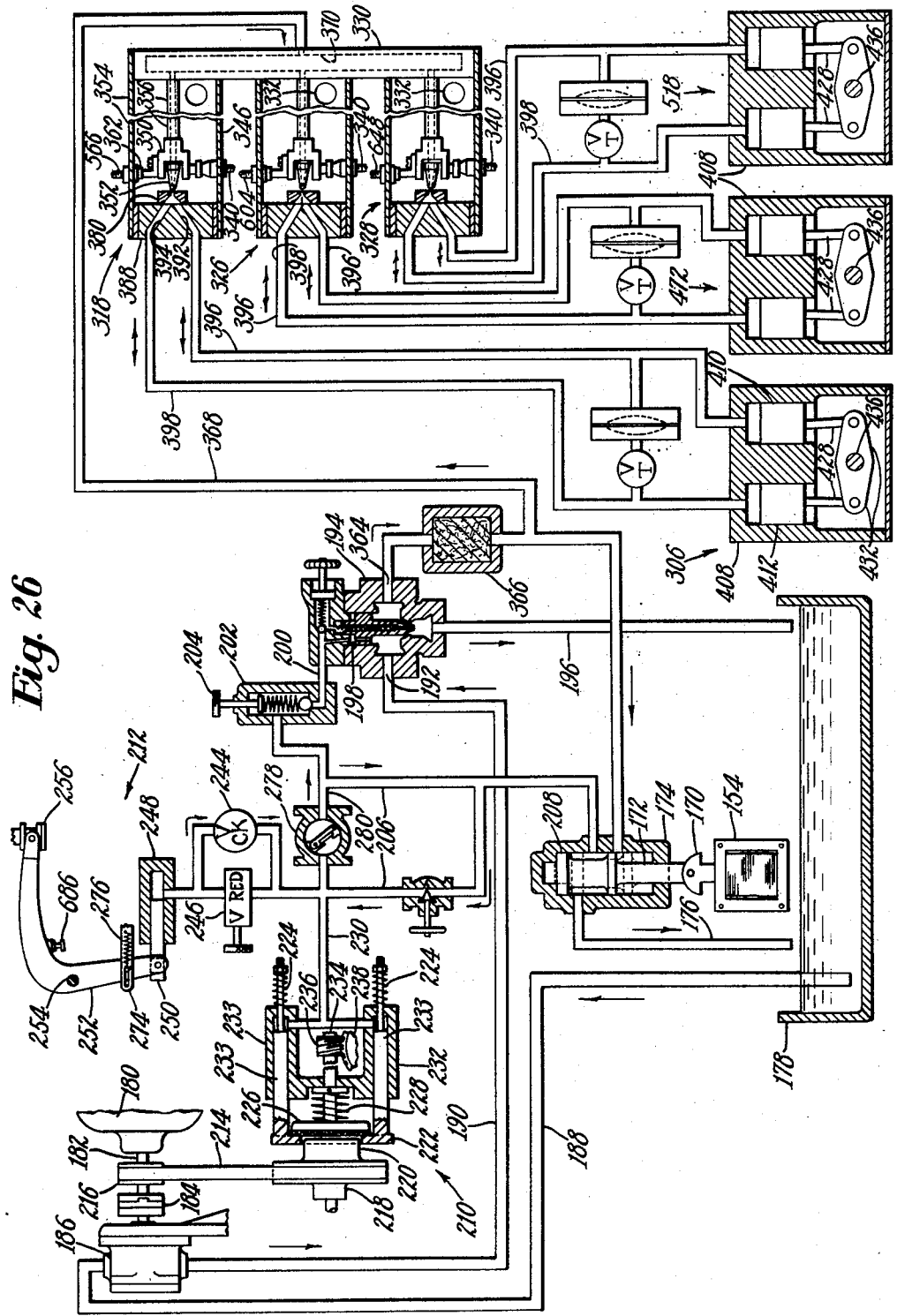
Fig. 26 is a diagrammatic view of the various fluid-pressure-operated controls and devices comprising the hydraulic system.

Referring mainly to Fig. 26, a plunger 170 of the solenoid 154 is connected to a valve plunger 172 shown in stop position and slidable in a valve housing 174. This housing has an exhaust line 176 which, in the stop position of the plunger 172, is open to a sump 178 containing oil, for example. For operating the main cam shaft 86 as well as several fluid-pressure means hereinafter to be described, a motor 180 (Figs. 1 and 26) continuously operative during operation of the machine drives a shaft 182 and, through suitable couplings 184, a rotary pump 186 having an intake line 188 extending into the sump. A pressure line 190 extends from the pump 186 to an open port 192 of a relief valve 194 which is pre-set to "spill" oil through a return or exhaust line 196 to the sump upon build up of pressure in excess of a normal operating amount, say 750 lbs. per square inch. The valve 194 may be of any suitable commercial type, the one herein shown being of the type shown in United States Letters Patent No. 2,043,453, granted June 9, 1936 upon an application of Harry F. Vickers. A port 198 of the relief valve 194 is open to the port 192 and to a line 200 leading to a relief valve 202. A hand screw 204 of the latter is pre-adjusted to vary the effective strength of a ball check to maintain a minimum pressure in the entire hydraulic system, including a line 206 leading from the valve 202, of at least a suitable predetermined amount, for instance 200 lbs. per square inch. When a spool 208 of the plunger 172 is shifted by the energized solenoid 154 to block the exhaust line 176, a piston of the spool permits high operating pressure from the valve 194 to be transmitted via the valve housing 174 to the line 206. The pressure line 206 is in operative connection, as will next be explained, with conventional hydraulic clutch mechanism generally designated 210 (Figs. 2 and 26) for operating the cam shaft 86 and last-clamping means generally designated 212 (Figs. 2, 4 and 26) associated with the shoe support 30.

Rotation of the motor shaft 182 drives, through an endless belt 214 (Figs. 1, 2 and 26) and pulleys 216, 218 connected thereby, a hub 220 integral with the latter. Mounted concentrically on this hub is an axially slidable brake member 222 normally held by a pair of compression or return springs 224, 224 (Fig. 26) in engagement with a driven friction clutch disk 226. The springs 224 thus normally overcome a compression spring 228 bearing in the opposite direction on the disk 226 and the latter is accordingly held out of driving relation with the hub 220. The arrangement is such that fluid pressure from the line 206, when admitted via a line 230 to cylinders 232, 232, respectively, having pistons 233 integral with the member 222 (upon energizing of the solenoid 154), is effective to overcome the springs 224 to release the brake member 222 and thereby enable the spring 228 to effect driving engagement of the disk 226 with the hub 220. Integral with the disk 226 is a shaft 234 (Figs. 2 and 3) formed with worm gear 236 which is arranged to mesh with a worm wheel 238 secured on the lower end of the cam shaft 86. For limiting rotation of this shaft to a single revolution per shoe to be shaped, as the shaft 86 is about to complete a turn to come to stop position, a stop cam 240 (Figs. 3, 18, 27 and 28) carried thereby effects opening of a normally closed switch 242 to deenergize a circuit including the solenoid 154.

The pressure line 206 is provided with a check valve 244 (Fig. 26) and a reducing valve 246 having a return connection (not shown) with the sump. By means of a hand screw the valve 246 may be adjusted to vary clamping pressure according to the requirements of shoes of different construction without affecting operation of the clutch-brake mechanism 210. Fluid pressure is admitted to a cylinder 248 (Figs. 3, 4 and 10) and is effective to displace its piston 250 for initially causing shoe-clamping movement of a lever 252 (Figs. 1, 2 and 4). This lever is fulcrumed at 254 in the portion 82 and operatively connected at one end to the piston 250, the other end of the lever carrying a last-clamping plunger 256 slidable vertically in a sleeve bushing 258 (Figs. 2 and 4) adjustably secured in the front end of the portion 82. Thus, it will be understood from the foregoing that in merely loading the shoe support properly with the shoe to be shaped, an operator automatically causes it to be clamped by fluid-pressure-actuated downward movement of the plunger 256 (into its phantom position shown in Fig. 4) against the last upon the heel block 144, and thereupon the machine, without further attention, executes in proper sequence all movements of the shoe needed to present and orient it to complete its shaping and subsequent discharge from the machine. While generally not considered essential for most types of work, a back heel centering gage 260 (Figs. 2, 3, 4 and 6) is at times useful as an aid in initially locating heel ends on the block 144. The gage 260 is formed with spaced heel-end engaging projections 262, 262 on its upper portion and secured at its lower end on one end of a cross rod 264 journaled in the base portion. The other end of the rod is secured to a lever 266, and a tension spring 268 (Fig. 4) connecting one end of that lever to the portion 80 normally serves yieldingly to maintain the gage 260 in its upright operating position until the shoe has been clamped in the manner described. In the course of the clamping movement of the lever 252 a pin 270 therein, received in a longitudinal slot 272 in one end of a bar 274, is effective to shift the latter rearwardly and, by reason of pin-and-slot connection of the bar to the lever 266, swings the gage 260 to an out-of-the-way retracted position preparatory to operation of the tool 32. A tension spring 276 (Fig. 4) connecting the bar 274 to the pin 270 offers less resistance to the fluid pressure than the brake applying springs 224 to insure shoe clamping prior to clutch actuation, and is effective, near the end of a cycle when the solenoid 154 is deenergized, to return the piston 250 and raise the plunger 256 to unclamp the shoe. Incidentally, at that stage of the cycle a check valve 278 (Fig. 26) in a line 280 connecting the lines 206 and 230 is operative to permit a quick drain of pressure fluid to the sump.

While the shoe support 30 is being moved by forces acting independently through its universal joint 84 to feed the shoe clamped thereon in predetermined rotation and translation as has been noted, forces acting through other points are imparted to the support 30 to present the shoe in appropriate manner to the tool 32 and to remove the shoe therefrom after trimming is completed. For this purpose, as will next be explained, a secondary system is provided which comprises cam actuated means operative solely for effecting major presenting and removing movements of the shoe and its support, and servo mechanism operative in the interval between the presenting and removing movements for precisely controlling and maintaining the position of the heel end relatively to the cutters 34 and 36 as dictated by the feeler 76 and a feeler 282 (Figs. 1, 2, 3, 11, 16 and 20) engageable with the periphery of the heel adjacent to its tread surface, the cam actuated means being arranged as herein shown to operate advantageously through jet relay means of the servo mechanism but independently of the control of its feelers. Three basically similar and independently acting mechanisms constituting the secondary system and illustrated in Figs. 14, 16 and 18, respectively, cause the shoe support 30 to be moved about mutually perpendicular axes, i.e., laterally toward and from the tool 32, in a direction heightwise of the shoe, and about an axis extending substantially through the joint 84 and the point of engagement of the feeler 76 with the shoe. Referring mainly at this time to Figs. 2 and 14, for effecting the lateral shoe presenting and removing movement, a cam 284 is secured on the cam shaft 86 and is engaged by a follower 286 carried by a lever 288. The latter is fulcrumed at one end on a pivot pin 290 affixed in a bracket 292 secured on the bearing block 102. The other end of the lever 288 is connected to an end of a composite link 294. For maintaining the roll 286 in contact with the cam 284, a compression spring 296 on the link 294 abuts the lever 288 and engages endwise an end of a bracket 298 slidably receiving the link. The limit of endwise movement of the link in one direction and maintaining suitable pressure of the roll on the cam is determined by a nut 300 threaded on the link. The bracket 298 is secured to the bracket 292. The link 294 has pivotal connection with one end of a feed back lever 302 the other end of which is pivoted to one arm of a bell-crank lever 304 constituting a part of a jet relay-controlled actuator generally designated 306 (Figs. 2, 3, 14, 17 and 26) later to be described. The other arm of the bell-crank lever 304 is pivotally connected by means of a ball-ended link 308 to a joint at X (Figs. 1, 2 and 14) provided on an ear of the base 80. Referring to Fig. 14, a throw 310 of the cam 284 is effective to shift the link 294 endwise to the right and thereupon operates through closed loop servo mechanism including the feed back lever 302 and a pin 312 carried thereby, as will shortly be explained, to swing the bell-crank lever 304 clockwise and hence presents the shoe laterally for engagement with the feeler 76 at a point initially above the rand crease, and after the trimming operation a fall 314 of the cam 284 permits reverse operation laterally to return the support 30 to its loading position. Stop screws 316, 316 threaded into the actuator 306 adjustably limit the range of swinging of the bell crank lever and hence the permissible range of lateral movement imparted to the support 30. It is to be noted that between the portions 310, 314 the cam 284 is concentrically formed and therefore ineffective in a portion of the cycle wherein actual trimming is to occur as will later be described.

Still referring mainly to that portion of the secondary system shown in Fig. 14, but as supplemented by Figs. 3, 11 and 26, lateral shoe-presenting movement is mechanically initiated as just indicated by operation of the cam 284, and is actually effected and completed by fluid pressure means under the control of its jet relay means, generally designated 318, operative to govern the actuator 306 and more particularly its lever 304. Thus the link 294 is first caused to urge the lever 302 counterclockwise as viewed in Fig. 14 about its pivotal connection to the bell-crank lever 304 and thereby moves the pin 312 to the right, thus permitting a loaded take-up or counterbalancing spring 320 (Figs. 3 and 11) mounted as subsequently described to act effectively through the relay means 318. For this purpose the pin 312 is received in a longitudinal slot 322 formed in one end of a rod 324 (Figs. 3, 11 and 14) operatively connected to the relay means 318 as will now be described. The means 318, and similar jet relay means 326 (Fig. 16), 328 (Fig. 18), respectively associated with mechanisms later explained for effecting the tilting and heightwise movements of the shoe support 30, are protectively housed in a box-like structure 330 (Figs. 1, 2, 3 and 11) mounted on the frame 50 and having a quick-drain connection 332 with the sump 178. The other end of the rod 324 has pivotal connection with one arm of a bell crank 334 (Figs. 3, 11 and 14) beneath the spring 320. The bell-crank 334 is pivotally supported by a short flexible metal strip 336 an end of which is affixed to an inturned portion of an upstanding bracket 338 secured on the frame adjacent to the housing 330. The aforementioned movement of the pin 312 to the right accordingly allows a pin 340 threaded into an arm of the bell crank 334 to be displaced by the pressure exerted thereon by a bushing 342 (Figs. 11, 14 and 23) extending through a rubber-like diaphragm 344 inserted in what may be termed a secondary-actuated wall 346 (Fig. 11) of the housing 330. As shown in Figs. 14 and 23 the bushing 342 is thus pressed, under influence of the spring 320 and later-described linkage associated therewith, by the head of a screw 348 threaded into a yoke 350 carrying an elongated, vertically disposed, jet nozzle 352 of the relay means 318. For purposes of distinction the wall of the housing 330 opposite to the wall 346 may be termed a servo or feeler-actuated wall 354 (Figs. 11 and 23). In this phase of operation the spring 320 is tending to effect displacement of the yoke and nozzle from the wall 354 toward the wall 346. Although the particular mounting of the jet relay nozzle employed is not here of special importance and hence not described in detail, it will be understood that a jet pipe 356 connected to the yoke and hence to the nozzle is of sufficient length to permit the displacement of the nozzle by reason of flexure of the pipe, and a nozzle mounting of the type disclosed in the Benedict and Finn patent referred to is preferred. From the foregoing it will be understood that the secondary-actuated displacement of the nozzle being described is effected by the spring 320 via a diaphragm 358 in the wall 354, an insert 360 in the diaphragm, and a block 362 connecting the insert and the yoke, to shift the orifice of the nozzle downwardly as viewed in Fig. 14, or to the left as viewed in Fig. 23.

Pressure fluid is supplied to the jet pipe 356 from an outlet 364 of the valve 194, via a filter 366 (Fig. 26), a line 368, a chamber 370 within the housing 330 and radial ports 372 (Fig. 23) formed in a cylindrical member 374 open to the chamber 370. The member 374 is secured at the inlet end of the jet pipe fixedly to anchor the latter to the housing 330. For purposes later described, a spring plunger 376 (Figs. 14 and 15) is arranged to be engaged by the crank 334 and yieldable into a bore formed in the bracket 338. In conventional manner control influence of the stream emitted from the relay nozzle is dependent upon positioning of the nozzle 352 relatively to two spaced, rectangular openings 378, 379 (Fig. 12) formed in a receiver block 380. The latter comprises adjacent parts 382, 384 secured by screws 386 to a header 388 in such a way as to maintain their common face 390 in a vertical plane symmetrically dividing the openings 378, 379 (Fig. 12) which are respectively connected to angularly related passageways 392, 394 (Figs. 23 and 26). Rigid tubes 396, 398 (Figs. 2, 14, 17 and 23) connect the passageways 392, 394 respectively with parallel bores 400, 402 respectively formed in cylinders 404, 406 (Fig. 17) fixedly secured within a casing 408 of the actuator 306. This casing is secured to the frame 50. The tubes are effective to maintain pressure fluid and apply a differential pressure, if any, to pistons 410, 412 slidable within the respective bores 400, 402 according to the position of the jet nozzle 352 in respect to the openings 378, 379. For normally biasing the nozzle to one side of a centered or neutral position relatively to the plane 390, to the extent permitted by the head of the screw 348, one end of a compression or fail-safe spring 414 (Fig. 23) on the screw 348 abuts the yoke 350 and the other end of the spring 414 abuts an arm 416 affixed on the header 388. A setscrew 418 in the arm 416 engages the block 380 to hold it clamped against a dowel pin in the header. Also, a stop button 420 in the arm 416 is disposed to engage the yoke and hence limits displacement in one direction of the nozzle from centered position. An end of the arm 416 carries a soft rubber-like pad 422 arranged slidably to be engaged by the flat end of a leaf 424 secured at its other end to the yoke 350 thus dampening any oscillation tendency of the jet nozzle.

The secondary-actuated displacement of the nozzle (downwardly as referred to with regard to Fig. 14) operates through the jet relay means 318 to apply a differential pressure to the piston 410 which is effective, as will next be described, to cause the lever 304 to be swung clockwise as viewed in Fig. 14 and thus swings the support 30 to present the shoe to the feeler 76. The pistons 410, 412 are each recessed and fitted with hardened seats 426 (Fig. 17) which are engaged respectively by the arcuate ends of connecting rods 428, 428, the other ends of which carry ball bearings 430 for effecting pivotal connection with remote ends of a two-part whiffletree that is comprised of jaw-like members 432, 432. In a coupling arrangement similar to two separate wrenches always opposing each other, one of these members 432 is inverted with respect to the other and they each have a rectangularly recessed end portion 434 formed to engage and grip more than one-half the periphery of a square-sectioned shaft 436 to the upper end of which the bell-crank lever 304 is secured. This arrangement, by reason of the normally maintained fluid pressure, overcomes the need for precision tolerances in parts and yet avoids lost motion. When fluid pressure is not being maintained, the members 432 are held in operative relation by a bent pin 438 (Fig. 17) loosely extending through alined bores in corners of the members. A pin 440 (Fig. 17) extending through the rods 428 respectively and into grooves within the pistons 410, 412 also retains parts in assembled relation when pressure is relieved.

As the lever 304 is swung to present the shoe to the feeler 76, the lever 302 is thus caused to be moved counterclockwise as seen in Fig. 14 about its connection with the link 294, and hence the pin 312 is now urged to return to the left to reduce the effective influence of the spring 320, and thereby permit re-centering of the jet nozzle so that during the trimming, which is about to commence, the secondary cam mechanism is of no effect. The arrangement thus provides a feed back from motion of the shoe support and is such that the rate of movement of the shoe toward the feeler is slowed just prior to their engagement. Accordingly, any possibility of damage to the shoe is avoided and opportunity is afforded for the shoe to be properly oriented by the several portions of the secondary mechanism concurrently operating to cause the rand crease to be engaged by the feeler 76 and the base of the heel periphery to be engaged by the feeler 282. The secondary mechanism thus positions the shoe in preparation for its trimming under full feeler control of later described servo mechanism.

In next describing that portion of the secondary mechanism effecting heightwise movement of the shoe support, which portion corresponds closely in structure and operation to the above-explained laterally acting secondary mechanism illustrated in Fig. 14, Fig. 18 is referred to in particular. Heightwise presenting and removing movement of the shoe is initiated by a cam 442 secured on the shaft 86 and engaged by a roll 444 carried by a lever 446, the latter being pivoted at one end on the pin 290. The other end of the lever 446 is connected to one end of a composite link 448. For maintaining the roll 444 in operative relation to the cam 442 a spring 450 on the link 448 abuts the lever 446 and engages endwise a bracket 452 secured to the bracket 292 and slidably receiving the link 448. The limit of movement of the link in one direction, and maintenance of suitable pressure of the roll on the cam 442 is determined by a nut 454 threaded on the link 448. The latter has a pivotal connection at one end with an arm 456 (Figs. 2 and 18) which is secured on a pivot pin 458 journaled in the frame 50. The pin 458 also carries an arm 460 parallel to, but vertically offset from the arm 456. The link 448 and a link 462 connected to the arm 460 thus operate as a unit to swing a feed back lever 464 initially counterclockwise, as viewed in Fig. 18, about its pivotal connection at 466 with a whiffle-tree member 468 pivotally supported at 470 by an actuator 472 later mentioned and associated with the shoe tilting secondary mechanism to be described. As herein shown, taut extension cables 474, 476 (Figs. 2 and 18), connected respectively to oppositely extending arms of the member 468, run over pulleys 478, 480 rotatably supported upon an actuator 482 corresponding to the actuators 306 and 472 but preferably mounted on the frame more nearly adjacent to the support 30. The cables are connected to oppositely extending arms of a bell-crank lever 484 secured on the shaft 436 of the actuator 482. The lever 484 is connected by means of a ball-ended link 486 to the shoe support base 80 at a point Y which is substantially on the line determined by the joint 84 and the point of engagement of the feeler 76 with a rand crease.

As has been noted, the transverse or laterally acting secondary mechanism initially operates to present the heel end for contact with the feelers at a point above the rand crease, whereupon, as indicated in Fig. 27, the tilt and heightwise secondary mechanisms operate together to raise the shoe and thus initially locate the feelers 76 and 282 in correct shoe-engaging position wherein trimming is to commence. A throw (not shown) of the cam 442 and its fall 488 (Fig. 18) initiate the vertical movement of the shoe support during presentation and removal respectively of the shoe, concentric portions of the cam 442 permitting heightwise movement of the shoe during actual trimming as dictated solely by the feeler 76 operating through the actuator 482 and its governing jet relay means 328 (Fig. 18) and servo mechanism later to be explained. For effecting heightwise movements of the shoe by fluid pressure, and in the manner described previously, the feed back lever 464 carries a pin 490 which is first moved to the right as viewed in Fig. 18 in a slot 492 formed in a rod 494, and this rod is connected at its other end to the jet relay means 328, in the same way and for the same purpose as the rod 324 is connected as above explained to the relay means 318. Accordingly, a take-up or counterbalancing spring 496 (Figs. 11 and 24), bearing on the carrier 74 and mounted as subsequently described, is allowed, upon the aforementioned movement of the pin 490 to the right, to become effective by acting via a diaphragm 358, an insert 360 and a block 362 to shift the nozzle 352 of the means 328 downwardly as viewed in Fig. 18 and thus acts through the actuator 482 to raise the shoe until reversal of the lever 464 and the pin 490 automatically arrests the shoe support 30 at a proper height for the commencement of wholly servo-controlled trimming.

That portion of the secondary mechanism effecting shoe tilting will now be described mainly with reference to Fig. 16. A cam 498 secured on the cam shaft 86 is engaged by a roll 500 carried by a lever 502 fulcrumed at one end on the pin 290. The other end of the lever 502 is connected to an end of a composite link 504. For maintaining the roll in operative relation with the cam 498, a compression spring 506 on the link 504 abuts the lever 502 and engages endwise a bracket 508 secured to the bracket 292 and slidably receiving the link 504. The limit of endwise movement of the link in one direction and maintenance of suitable pressure of the roll on the cam 498 is determined by a nut 510 threaded on the link. The latter has pivotal connection with one end of a feed back lever 512 the other end of which is pivoted to an upper arm of a composite bell-crank lever 514. This lever is mounted on the jet relay-controlled actuator 472 in the same way that the corresponding bell crank lever 304 is mounted on its corresponding actuator 306. The construction and operation of the actuators 306, 472 and 482 being substantially identical (except that a shaft 516 (Figs. 2 and 16) on which the lever 514 is secured is longer and has bearing in an ear of the actuator 306), their parts bear corresponding reference characters. The other arm of the lever 514 is connected by means of a ball-ended link 518 to a joint Z (Figs. 1, 2 and 16) provided on an ear of the base portion 80 directly below the joint X, as noted in Fig. 2. Stop screws 520, 520 threaded into the actuator 472 adjustably limit the range of the movement of the lever 514. Tilting movements of the shoe support 30 are initiated during presentation and removal respectively of the shoe relatively to the tool 32 and the feelers by a throw 522 and fall 524 of the cam 498, and concentric portions of the latter permit tilting of the shoe during actual trimming solely as dictated by the feeler 282 operating through the actuator 472 and its governing servo means later explained. For effecting the shoe tilting movements by fluid pressure in the manner previously noted, the lever 512 carries a pin 526 which is initially moved to the right (as viewed in Fig. 16) in a slot 528 formed in a rod 530 operatively connected to the jet relay means 326 corresponding to the means 318 and 328. Since the means 318, 326 and 328 are alike in construction and operation except for minor details about to be noted, their corresponding parts bear like reference characters. The movement to the right of the pin 526 allows a take-up or counterbalancing spring 532 (Figs. 3, 19 and 20) mounted as later explained and acting through the relay means 326 to become effective in a manner corresponding to the operation of the springs 320 and 496 on the relay means 318 and 328, respectively. The spring 532 tends to displace the tilt nozzle 352 (Fig. 16) of the means 326 from the wall 354 toward the wall 346 by acting via a diaphragm 358, an insert 360 therein, and a block 362 connecting the insert 360 and a yoke 350 carrying the tilt nozzle 352. This nozzle displacement from neutral position accordingly effects tilting of the shoe being presented until it arrives at or near feeler-engaging position in which trimming is to commence, whereupon reversal of the movement of the lever 512 and the pin 526 by operation of the actuator 472 is effective, in the manner previously explained in the case of the actuator 306, to restore the tilt nozzle to neutral and thereupon permit it to be solely under the control of feeler-controlled servo mechanism to be described. As shown in Fig. 13, the tilt nozzle 352 and tilt openings 533, 533 differ from the corresponding relay parts shown in Fig. 12 for the reason that tilting movements require the use of relatively more oil. Accordingly, the tilt openings and nozzle are larger and it is preferable to mount a thin blade 534 (Fig. 13) (of the order of .020" thickness) between the adjacent faces of the blocks 382, 384 to symmetrically divide the tilt openings 533 longitudinally.

For controlling the heel end transversely, i.e., laterally, with respect to the cutters 34, 36, movements of the feeler 76 imparted by its engagement with the rand crease of a shoe as it is fed to be trimmed are transmitted by the carrier 74 (Fig. 11) and associated linkage to the nozzle 352 of the relay means 318 (Fig. 14) as will now be explained. The cutter frame 44 is for the most part housed in an upstanding portion 535 (Figs. 1, 3, 11 and 19) of the frame 50. For supporting the carrier 74 for horizontal movement a cover 536 (Figs. 3, 11, 19 and 24) is removably mounted on the frame portion 535 by means of a vertical setscrew 538 abutting it and by a stud 540 threaded into the cover and extending through a vertically disposed slot 542 in the frame 535, a wing nut 544 on the stud normally being drawn against a clamping block 546. Conveniently, when an operator wishes to service the randing cutters 34, he may remove the rand cutter assembly by loosening the wing nut 544 and lifting off the cover 536 with its feeler linkage, the assembly being illustrated in Fig. 24. The cover 536 supports a pair of parallel rods 548, 548 (Figs. 11, 14 and 24) on which is movably mounted, by means of linear bearings 550, a slide 552. The carrier 74 is coupled to the slide by a pair of flexible leaf supports 554, 556 (Fig. 11) permitting heightwise movement of the feeler 76. For retaining parts in assembled relation, incidentally, a light tension spring 558 (Figs. 11 and 24) has one end connected to the cover 536 and the other end connected to a crosspiece in the slide 552. Connected at one end to the slide is a plunger 560 (Figs. 3 and 11) bearing endwise on the upper end of a lever 562 (Figs. 11, 19 and 21) which is being counterbalanced by the aforementioned spring 320. The latter is supported for this purpose by a horizontal rod 564 anchored in the bracket 338. The lower end of the lever 562 adjustably carries a ball-ended push rod 566 one end of which bears on the insert 360. For transmitting feeler pressure via the push rod 566 to the insert 360 and hence to the relay means 318 the lever 562 is fulcrumed as will next be explained. A projection 568 (Figs. 11 and 19) of the frame 535 has secured thereto a flexible metal strip 570 on which is affixed an upstanding link 572 (Figs. 3, 11 and 19) the upper end of which slidably receives a stud 574 threaded into the frame 535. The upper end of the link 572 is adjustably held against a knurled nut 576 threaded on the stud 574 by a spring 577 which acts like a locknut and is mounted on the stud and abuts the frame 535 endwise. Thus, the link carries a fulcrum pin 578 (Figs. 11, 19, 21 and 22) on which the lever 562 is pivotable, a leaf spring 580 affixed at one end to the lever being flexed against the pin 578 by means of a pin 582 anchored in the link 572. For maintaining the lever 562 in pivotal contact with the fulcrum pin 578 a bent wire spring 584 having one end secured to the link 572 is biased to bear with its other end on the lever 562.

Means next to be explained is provided for transmitting tilting control during trimming from the feeler 282 to the jet relay means 326. Referring mainly to Figs. 3, 16, 19 and 20, a bracket 586, perhaps best shown in Fig. 20, is adjustably secured by a clamping bolt 588 to the frame 535 and provides aligned bores for fixedly supporting a horizontal guide rod 590. A stud 591 (Fig. 19) threaded through a bore formed in the frame portion 535 and received in a strap 593 connected to the bracket 586 serves to adjust the heightwise position of the feeler 282 and its assemblage. A hollow cylinder 592, on one end of which the feeler 282 is adjustably secured, is slotted longitudinally in its lower wall and is thus axially slidable within limits on the rod 590 by means of spaced linear bearings 594, 594 (Fig. 20). Threaded into the other end of the cylinder 592 is an adaptor 596 threadedly carrying a plunger 598. The latter bears against one side of the upper end of a lever 600 (Figs. 3, 11, 16, 19, 20 and 21) in opposition to the lower end of the counterbalancing spring 532 contacting the opposite side of the lever 600. The spring 532 is secured at its upper end to the frame projection 568. The lever 600 adjustably carries in its lower end a push rod 604 (Figs. 11, 19 and 21), and is pivotally mounted, as will now be described, to cause the rod 604 to bear endwise on the insert 360 of the jet means 326. As herein shown, referring particularly to Figs. 21 and 25, the pivotal mounting of the lever 600 is such as to prevent an effective shoe tilting signal from being given to the means 326 when there is no actual change of inclination in the peripheral portion of the heel being trimmed, as for instance when both of the feelers 76 and 282 might simultaneously be displaced in the same lateral direction by the shoe without changing their relative jet-relay operating positions. For this purpose a cross lever 606 (Figs. 21 and 25) has an end formed with a socket for receiving the ball end of the rod 566 and extends, for winking movement about a vertical axis, through a slotted projection 608 of the frame 535. A U-shaped flexible metal strip 610 (Fig. 21), secured outboard of the projection 608, carries a block 612 and the latter receives rivets for securing one end of a retainer spring 614 the other end of which is forked yieldingly to urge the ball end of the rod 566 into its socket. The other end of the cross lever 606 is effectively clamped to one end of a compensating lever 615 by means of a stud 616 engaging the cross lever endwise and extending through check nuts 618, through the lever 615, and through one end of a U-shaped leaf spring 620. A fulcrum pin 622 for the lever 600 extends upward from the compensating lever 615 which is supported at its lower end by a flexible metal fulcrum strip 624 held on the outboard end of a frame projection 626. The linkage accordingly operates, when both feelers move together to the same extent, to maintain the levers 600 and 615 in parallel relation whereby the rod 604 is not then moved endwise. From the foregoing it will be understood that pressure signals on the insert 360 for operating the jet-relay means 326 are normally responsive to displacements of the feeler 282 and thus tilt the shoe, but that the compensating linkage just described is operative, by changing the effective position of the fulcrum pin 622, to render the tilting signal noneffective when corresponding and simultaneous displacements of the feeler 76 signal via the push rod 566 that heightwise pitch of the heel is unchanged. For urging the lever 600 into pivotal relation with the pin 622 a leaf spring 628, secured at one end to the lever 600, has its other end latched on a pin 630 in the compensating lever 615. A bent wire spring 632 secured at one end to the lever 615 engages the lever 600 oppositely to the pin 622 to maintain their operative relation.

Means now to be described is provided for transmitting heightwise control of the shoe during trimming from the feeler 76 to the jet-relay means 328. Referring to Figs. 11, 18 and 19, a flat end of the carrier 74 rests upon a roll 634 rotatably supported by an arm of a bell-crank lever 636. This lever projects through the slot 542, and an arm 638 of the lever is secured for pivotal movement about a horizontal axis to a horizontal flexible metal strip 640 (Figs. 11, 19 and 24) which, in turn, is secured to a depending end portion of the cover 536 also extending through the slot 542. A flat U-shaped, vertical fulcrum spring 642 connected at its extremities to the depending portion of the cover 536 and to the lever 636 fixedly establishes the horizontal axis about which the lever 636 can pivot upon heightwise movement of the feeler 76. The latter is caused to be pressed downwardly against the rand surface of a shoe by the counterbalancing spring 496. Upward movement of the roll 634 bearing on the carrier 74 is yieldingly opposed by the spring 496 (Fig. 11) for failsafe as well as operational purposes, the spring 496 being horizontally supported by the slide 552 in a position immediately above the carrier and the roll. The lower end of the bell-crank lever 636 is rounded for engagement of one end of a link 646 (Figs. 11 and 19) which is thus movable parallel to itself and carries in its lower end a push rod 648 bearing endwise on the insert 360 of the means 328. The link 646 is carried at opposite ends by parallel flexible metal fulcrum strips 650 and 652, respectively. For this purpose ends of these strips are secured respectively to a member 654 mounted at its lower end on a flexible metal fulcrum strip 656 carried outboard of a frame projection 658. The upper end of the member 654 is bored slidably to receive a stud 660 threaded into the frame 535, and a knurled nut 662 adjustably threaded on the stud 660 cooperates with a spring 663 (which acts like a locknut) mounted on the stud and abutting the frame 535.

Illustrated in Fig. 3 is safety mechanism comprising a push lever 664 (Figs. 3, 11 and 15) by which an operator may at any instant in an operating cycle cause the shoe mounted in the machine to be swung back to its loading position and the cutter motor 48 stopped. The lever 664 is pivotally mounted on a fulcrum pin 666 journaled in the bracket 338, and adjustably carries three setscrews 668 arranged to engage endwise, respectively, caps 670 (Fig. 15) slidable in the bracket and normally separated from their respective plungers 376 by a compression spring 672. On pushing the lever 664 clockwise, as viewed in Fig. 3, by means of its knob 674, the screws 668 cause the plungers 376 to urge the jet-relay bell cranks 334 clockwise, and hence the nozzles 352 of the relays 318, 326 and 328 are deflected in a manner to cause the pistons 410 of the actuators 306, 472 and 482 to return the shoe support 30 to its loading or unloading position. A latch 676 pivoted at one end to the bracket 338 normally retains the push lever 664 in an inoperative position, the latch being held in retaining position by a tension spring 678 (Fig. 11) connecting it to the bracket 338. Pushing the knob 674 also actuates a switch 680 (Fig. 3) for interrupting a circuit connected to the cutter motor 48. Optional additional safety means are provided in the form of a strip switch 682 (Fig. 4) affixed on the portion 82 and a switch 684 (Fig. 20) which are connected in series in a circuit (not shown) connected to the cutter motor 48 and the motor 180. Thus, when no shoe is mounted on the support 30 or if the clamping plunger 256 should slide off a last within the shoe, a setscrew 686 (Fig. 4) adjustably carried by the lever 252 would trip the switch 682 to stop both motors. The switch 684 is secured to the bracket 586 and arranged to be actuated by a lever 688 (Fig. 20) pivoted thereto. Accordingly, a guard 690 (Figs. 2 and 20) on the support portion 80 is arranged, in the event the latter is being moved heightwise toward engagement with the cutters 34, 36, to pivot the lever 688 and hence open the switch 684. Though not shown by diagram herein, the electrical arrangement is further such that, upon tripping either of the switches 682 or 684, a solenoid 692 (Fig. 3) is energized and hence its plunger 694 is effective, by means of a chain 696, automatically to operate the emergency push lever 664 with the results heretofore related. A projection 698 (Figs. 3 and 20) of the bracket 586 limits upward movement of the shoe support toward the cutters.

Briefly to review operation of the machine, its cycle is initiated by merely placing the heel end of a shoe on the block 144 with the heel breast properly drawn against the gage 152 to close the switch 150. The solenoid 154 (Fig. 26) is thereupon energized to provide fluid pressure for operating the hydraulic system of the machine. The piston 250 of the last clamping means 212 first causes the plunger 256 to hold the shoe as positioned on the block 144 whereupon the clutch mechanism 210 becomes effective to rotate the cam shaft 86 a single revolution. In this revolution the shoe support 30 is moved laterally and the block 144 is rotated by forces acting through the universal joint 84 to feed the shoe in translation and in rotation, the cams 92 and 88 operating as indicated in Fig. 27 and above explained. It will be understood that the primary feeding movements thus effected prescribe a basic path of feed for each shoe, the shoe being reversed end for end prior to engaging the feelers 76 and 282 and again during actual trimming operation on a heel end as suggested by Figs. 14 and 27. Upon this primary or mechanical shoe feeding mechanism is imposed the secondary or fluid pressure operated means for controlling the feed of an individual shoe to be shaped according to its particular heel end contour. In this secondary system major movements of each shoe to present it to (and subsequently remove it from) the feelers 76 and 282 are initiated, or signaled for, by the cams 284, 442 and 498; their associated closed servo mechanisms thereupon respectively produce the requisite lateral heightwise and tilting movements of the support 30, above-described linkages operating in each case through the jet-relays 318, 328 and 326, respectively, and the actuators 306, 482 and 472, respectively. The latter control the positioning of the shoe support 30 by forces applied respectively to the points X, Y and Z (Fig. 2). The arrangement is such that each actuator is thereafter controlled only by a shoe engaging feeler 76 or 282 and its responsive jet-relay. That is, during actual trimming the concentric portions of the cams 284, 442 and 498 are being traversed and they are of no effect; hence heel end positioning relatively to the cutters 34, 36 is then being solely dictated laterally and heightwise by rand-crease engagement of the feeler 76, and tiltingly about an axis extending through the joint 84 and that point of engagement, by the feeler 282 contacting the heel periphery adjacent to its tread surface.

After trimming of the heel is concluded (at about 300°—see Fig. 27), the fall portion 314 of the cam 284 automatically permits return movement of the rod 294 to the left, as viewed in Fig. 14, and clockwise movement of the feed back lever 302 with respect to its connection to the lever 304. Consequent movement to the left of the rod 324 transferred by the pin 312 in the feed back lever 302 is effective to raise the nozzle 352 (against resistance of the spring 320 of the jet relay means 318 (as viewed in Fig. 14), and hence hydraulic pressure is now effective via the piston 412 to shift the shoe and its support 30 laterally away from the tool 32 and the feeler 76. Corresponding support removing actions are also initiated at substantially the same time by the cam fall portions 488 and 524 to restore the shoe to its unloading position. It will be understood that the removal motion is arrested by the appropriate servo loop in each instance. Thus, for instance, referring to Fig. 14 again, the roll 286, having returned to a concentric portion of the cam 284, the just-mentioned clockwise movement of the feed back lever 302 shifts to clockwise with respect to its connection to the rod 294, and hence the pin 312 now permits the counterbalance spring 320 to restore the nozzle 352 and the actuator 306 to its neutral position.

As above noted, the switch 150 and the switch 242 were closed in the first portion of an operating cycle, and a relay 700 (Fig. 28) accordingly had been energized to complete a holding circuit through a contact 702 to maintain the solenoid 154 energized. After trimming has been completed and as the revolution of the cam shaft 86 is nearly completed, the stop cam 240 (Figs. 18 and 28) opens the switch 242 to deenergize the solenoid 154. The valve plunger 172 (Fig. 26) accordingly returns to its starting position shown in Fig. 26 and the consequent rapid drop in fluid pressure permits cessation of drive through the now uncoupled clutch 210 and completion of the single revolution of the cam shaft 86, followed by unclamping of the shoe. If so desired, the shoe is permitted to fall by gravity into a container 704 (Fig. 1) mounted on the front of the machine.

From the foregoing it will be apparent that the construction herein disclosed is, by contrast with that disclosed in the United States Letters Patent No. 2,644,968 referred to above, adapted to yield a higher production with less operator effort, less load is imposed upon the transversely and vertically operating servo mechanisms since a considerable portion of the weight of the shoe support 30 is advantageously carried at the universal joint 84, and the shoe tilting servo mechanism advantageously rotates the shoe support 30 about a horizontal axis with a minimum radius of gyration. The reduced mass of moving parts, and the loading of all connections and pivots in one direction as far as possible, contribute to enhanced sensitivity of response and avoidance of lost motion.

Having thus described my invention, what I claim as new and desire to secure by Letters Patent of the United States is:

1. A machine for shaping the ends of shoes having, in combination, a power driven tool for operating on the periphery of an end of a shoe, a support for the shoe, said support being movably suspended from a universal joint, means acting through the joint for rotating the shoe about an axis heightwise thereof to present the shoe end periphery progressively to the tool, means acting on said joint for swinging the support to move the shoe bodily relatively to the tool, and means thereupon acting on the support at points nearer the tool than said joint to modify the position of the shoe relatively to the tool during operation of the tool thereon.

2. In a machine for shaping peripheral portions of shoes, a power driven tool for trimming the attached heel and adjacent portion of the heel end of an outsole of the shoe, a support for the shoe having rotary shoe clamping means, a universal joint from which a portion of the weight of the clamped shoe and of the shoe support is suspended, primary means operable through said joint for feeding the shoe in a predetermined path relative to the tool, and secondary means independently operable on the support adjacent to the shoe to shift the support about one or more axes passing through said joint to modify the path of feeding of the shoe according to a contour of its heel end.

3. A machine as set forth in claim 5 and further characterized in that said secondary means comprises jet relay-controlled actuators operatively connected to the shoe support, respectively, to move it laterally, tiltingly, and heightwise with respect to the tool, feeler-controlled servo mechanism connected to the controlling jet relay of each of the actuators, and cam controlled means for cyclically initiating and terminating actuation of the jet relays before and after operation of said tool on the shoe to effect presentation and removal of the support relatively to the tool.

4. In a machine for operating on shoes, a tool for trimming a selected periphery of a shoe, a support for the shoe having a rotatable base and a relatively movable overhanging member cooperative with the base to clamp the shoe thereon, a universal joint from which at least a part of the weight of the shoe and of the support therefor is suspended, power means operable through the joint to swing the support and rotate the base to present the shoe periphery to the tool, and means including a switch responsive to positioning of the heel breast of the shoe on the base for controlling the power means and said clamping member.

5. In a machine for trimming the attached heels of shoes, a power driven trimming tool, a shoe support movable in translation and rotation to cause the periphery of the heel of a shoe thereon to be fed in a predetermined path adjacent to the tool, primary means for thus moving the shoe support, and a secondary system comprising means adapted, respectively, to move the shoe support laterally, tiltingly, and heightwise both for presentation and removal of the shoe relatively to shoe-engaging feelers and responsively during the interval of trimming according to displacements of the feelers by the shoe, each of the means of said system including a fluid-pressure-controlled actuator operatively connected to the support, a normally feeler-controlled jet relay for operating the actuator during the trimming interval, and cam actuated means for cyclically assuming control of the jet relay to effect presentation and removal of the shoe relatively to the feelers.

6. Mechanism for controlling movement of a shoe-carrying support relatively to a power tool adapted to operate on the periphery of the shoe on the support, comprising fluid-pressure-controlled actuators respectively connected to the support for moving it laterally, tiltingly and heightwise, jet relay means for operating each actuator, a pair of shoe-engaging feelers responsive to contours, respectively, of the shoe for controlling the relay means during operation of the tool along the periphery, and means for cyclically assuming control over the jet relay means to cause the actuator to effect presentation and subsequent removal of the support and its shoe relatively to said tool and feelers.

7. Mechanism as set forth in claim 6 and further characterized in that the means for cyclically assuming control comprises cams respectively adapted and arranged to initiate and terminate operation of each jet relay means in a manner to cause said support to move predetermined portions of the shoe into and out of contact with the feelers.

8. Mechanism as set forth in claim 7 and further characterized in that the actuators, respectively, have a feedback connection to said cyclical control means whereby the rate of presentation of the shoe is controlled according to the configuration of the cams.

9. Mechanism as set forth in claim 7 and further characterized in that the respective cams become inoperative when feeler-engaging contacts have been made by the shoe, and thereafter the position of the shoe with respect to the tool is solely controlled by displacement from neutral of the jet relay means by engagement of the shoe with said feelers.

10. A system for controlling movement of a shoe-carrying support suspended at least in part from a movable, universal type of joint, comprising a plurality of actuators, each of said actuators comprising a lever operatively connected to the support for respectively moving it laterally, tiltingly or heightwise, and a pair of oppositely acting pistons responsive to differential fluid pressure for swinging the lever, jet relay means for causing differentials in fluid pressure to operate the respective actuators, shoe-engaging feeler means responsive to contour of the shoe on the support for normally controlling the jet relay means during an operation on the shoe, and other means for controlling the jet relay means at other times.

11. A system for controlling movement of a shoe-carrying support relatively to a power tool adapted to operate on a shoe clamped on the support, comprising fluid pressure operated actuators respectively adapted to move the support in a different and reversible direction, jet relay means each independently adapted to operate one of the actuators, each of said means having a neutral position and two oppositely disposed operating positions, means for cyclically biasing each of said means from its neutral position to one and then the other of said operating positions to shift the support and its shoe toward and subsequently away from the tool, and shoe-engaging feeler means operatively connected to each of said relay means for shifting the latter to either of said operating positions to position the shoe relatively to the tool, said biasing means being adapted to release the relay means to sole control of said feeler means in the interval between presentation and removal of the shoe with respect to the tool.

12. In a machine for shaping selected portions of shoes, a power driven tool, a support for a shoe partially suspended from a joint, primary means operable to move the support to cause the shoe to prescribe a basic path in the vicinity of the tool, and secondary means for acting on the support to shift a selected portion of the shoe from said path and into effective operating position relatively to the tool, said secondary means being apapted to move the support about axes extending through the joint to transfer the point of operation of the tool about the selected portion of the shoe in accordance with a contour thereof.

13. In a machine for shaping the ends of shoes, a power driven tool, a support for a shoe suspended from a universal joint remote from the tool, primary means operable to move the support to cause an end of the shoe to prescribe a basic path in the vicinity of the tool, and secondary means for automatically acting on the support adjacent to the shoe thereon to shift it from said path and into effective operating position relatively to the tool, said secondary means including a shoe engaging feeler effective to move the support about axes extending through the universal joint to transfer the point of operation of the tool about the end of the shoe in accordance with the contour of that end of the shoe.

14. A machine as set forth in claim 13 and further characterized in that the secondary means are adapted to apply forces at three points respectively arranged to move the support about mutually perpendicular axes extending through the universal joint.

No references cited.